(12) United States Patent
Durvasula et al.

(10) Patent No.: US 12,657,599 B2
(45) Date of Patent: Jun. 16, 2026

(54) PERSONALIZED RECOMMENDATION SYSTEMS TO REMEDIATE INEFFICIENCIES IN USER BEHAVIOR

(71) Applicant: TEACHERS INSURANCE AND ANNUITY ASSOCIATION OF AMERICA, New York, NY (US)

(72) Inventors: Sastry VSM Durvasula, Phoenix, AZ (US); Thasunda Brown Duckett, Greenwich, CT (US); Swatee Singh, Livingston, NJ (US); Rares Ioan Almasan, Paradise Valley, AZ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 19 days.

(21) Appl. No.: 18/384,207

(22) Filed: Oct. 26, 2023

(65) Prior Publication Data

US 2025/0139656 A1 May 1, 2025

(51) Int. Cl.
G06Q 30/02 (2023.01)
G06N 5/022 (2023.01)
(Continued)

(52) U.S. Cl.
CPC ......... G06Q 30/0215 (2013.01); G06N 5/022 (2013.01); G09B 19/00 (2013.01); G06Q 10/1057 (2013.01); G06Q 40/06 (2013.01)

(58) Field of Classification Search
CPC .............. G06Q 30/02; G06Q 30/0215; G06Q 10/1057; G06Q 40/06; G06Q 30/0254;
(Continued)

(56) References Cited

U.S. PATENT DOCUMENTS 9,710,757 B2 * 7/2017 Gilon ..................... G06N 99/00
10,706,453 B1 * 7/2020 Morin ...................... G06N 5/01
(Continued)

FOREIGN PATENT DOCUMENTS

CN 101779180 A * 7/2010 .............. G06F 3/00
CN 112069418 A * 12/2020 .............. G06K 9/62
WO WO 2022/150205 A1 * 7/2022 .............. G16H 20/00

OTHER PUBLICATIONS

J. Karim; M. Manceny; R. Chiky; M. Manago; M-A Aufaure, Using collaborative filtering to enhance domain-independent CBR recommender's personalization (English), 2015 IEEE 9th International Conference on Research challenges in Infomation Science (RCIS) (2015, pp. 456-467), May 1, 2015 (Year: 2015).*
(Continued)

*Primary Examiner* — Marilyn G Macasiano
(74) *Attorney, Agent, or Firm* — MARSHALL, GERSTEIN & BORUN LLP

(57) ABSTRACT

A method for generating predictive and event-based action recommendations includes receiving, from at least one data source, input data representative of a user; generating, using a first machine learning model, a user behavior pattern for the user based on the input data representative of the user; classifying the user behavior pattern based on one or more personas representative of user characteristics; identifying, based on at least the input data and the one or more personas, an inefficiency in the user behavior pattern impacting a goal of the user; and generating, using a second machine learning model, a personalized recommendation for the user to remediate the inefficiency.

12 Claims, 7 Drawing Sheets

(51) Int. Cl.
| | |
|---|---|
| *G06Q 30/0207* | (2023.01) |
| *G09B 19/00* | (2006.01) |
| *G06Q 10/1057* | (2023.01) |
| *G06Q 40/06* | (2012.01) |

(58) Field of Classification Search
CPC ............. G06Q 10/067; G06Q 30/0246; G06Q 30/0207; G06N 5/022; G09B 19/00
See application file for complete search history.

(56) References Cited

U.S. PATENT DOCUMENTS

| | | | | |
|---|---|---|---|---|
| 11,423,462 | B2 * | 8/2022 | Schiff ................ | G06Q 30/0643 |
| 2012/0311139 | A1 * | 12/2012 | Brave ................ | G06F 16/9535 |
| | | | | 709/224 |
| 2019/0370146 | A1 * | 12/2019 | Babu ................ | G06F 16/24545 |
| 2020/0334676 | A1 * | 10/2020 | Wang .................... | G06Q 20/40 |
| 2021/0142217 | A1 * | 5/2021 | Valline ................. | G06F 16/245 |
| 2023/0377023 | A1 * | 11/2023 | Buzzell ............. | G06Q 30/0641 |

OTHER PUBLICATIONS

A. Alsalemi; C. Sardianos; F. Bensaali; I. Varlamis; A. Amira; G. Dimitrakopoulos, The Role of Micro-Momemnts: A Survey of Habitual Bahavior Change and Recommendations Systems for Energy Saving (English), IEEE Systems Journal (vol. 13, Issue: 3, 2019, pp. 3376-3387), Mar. 22, 2019 (Year: 2019).*

* cited by examiner

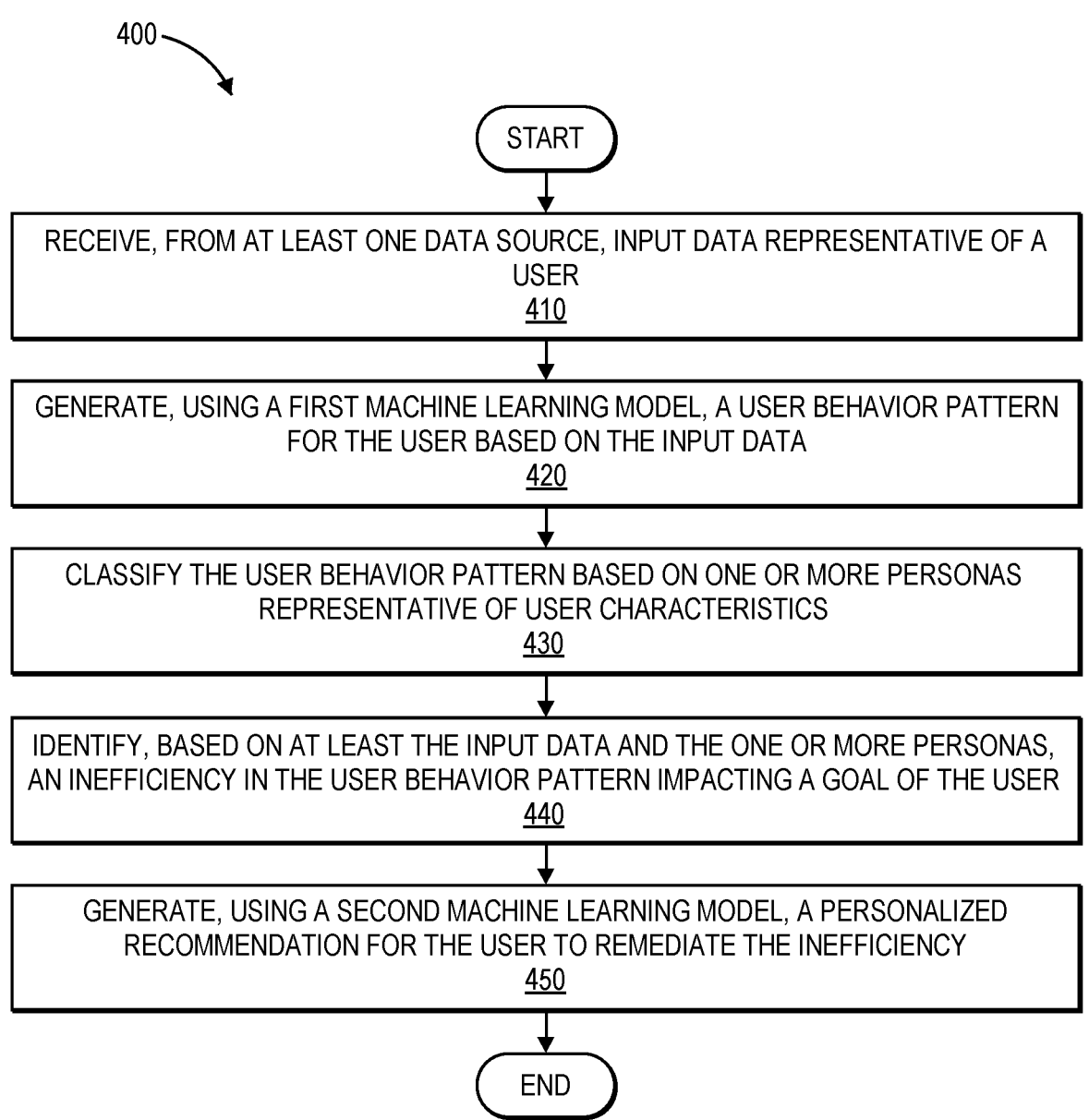

400

START

RECEIVE, FROM AT LEAST ONE DATA SOURCE, INPUT DATA REPRESENTATIVE OF A
USER
410

GENERATE, USING A FIRST MACHINE LEARNING MODEL, A USER BEHAVIOR PATTERN
FOR THE USER BASED ON THE INPUT DATA
420

CLASSIFY THE USER BEHAVIOR PATTERN BASED ON ONE OR MORE PERSONAS
REPRESENTATIVE OF USER CHARACTERISTICS
430

IDENTIFY, BASED ON AT LEAST THE INPUT DATA AND THE ONE OR MORE PERSONAS,
AN INEFFICIENCY IN THE USER BEHAVIOR PATTERN IMPACTING A GOAL OF THE USER
440

GENERATE, USING A SECOND MACHINE LEARNING MODEL, A PERSONALIZED
RECOMMENDATION FOR THE USER TO REMEDIATE THE INEFFICIENCY
450

END

FIG. 4

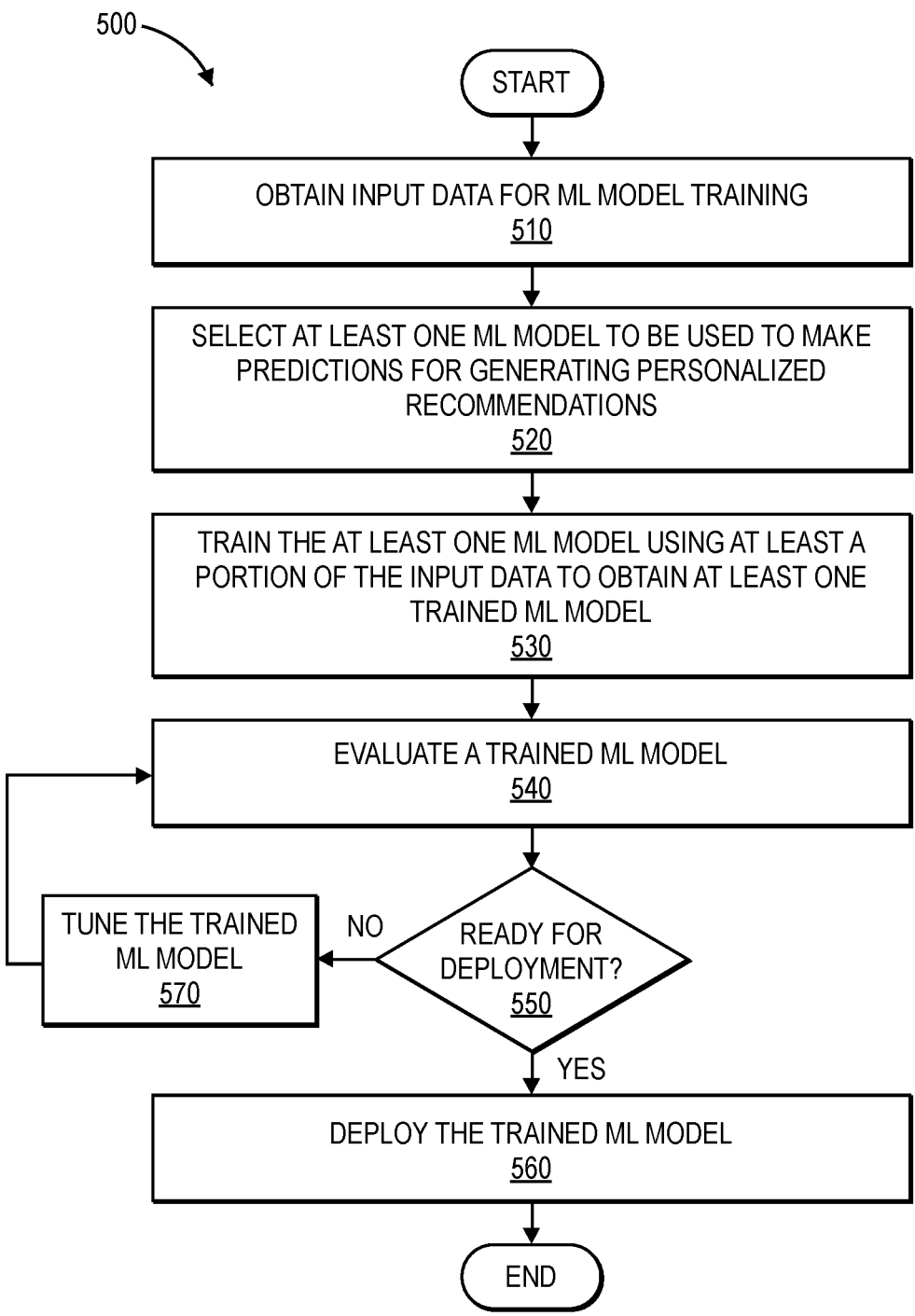

500

START

OBTAIN INPUT DATA FOR ML MODEL TRAINING
510

SELECT AT LEAST ONE ML MODEL TO BE USED TO MAKE
PREDICTIONS FOR GENERATING PERSONALIZED
RECOMMENDATIONS
520

TRAIN THE AT LEAST ONE ML MODEL USING AT LEAST A
PORTION OF THE INPUT DATA TO OBTAIN AT LEAST ONE
TRAINED ML MODEL
530

EVALUATE A TRAINED ML MODEL
540

TUNE THE TRAINED
ML MODEL
570

NO

READY FOR
DEPLOYMENT?
550

YES

DEPLOY THE TRAINED ML MODEL
560

END

| | |
|---|---|
| PROCESSING DEVICE 602 | VIDEO DISPLAY 610 |
| MAIN MEMORY 604 | ALPHANUMERIC INPUT DEVICE 612 |
| STATIC MEMORY 605 | CURSOR CONTROL DEVICE 614 |
| NETWORK INTERFACE DEVICE 608 | SIGNAL GENERATION DEVICE 615 |

630

NETWORK 620

DATA STORAGE DEVICE 618

COMPUTER-READABLE STORAGE MEDIUM 628

PERSONALIZED RECOMMENDATION SYSTEMS TO REMEDIATE INEFFICIENCIES IN USER BEHAVIOR

TECHNICAL FIELD

Implementations of the disclosure relate generally to recommendation systems, and more specifically, relate to personalized recommendation systems to remediate inefficiencies in user behavior.

BACKGROUND

An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software.

SUMMARY

In one aspect, a computer-implemented method for generating predictive and event-based action recommendations is provided. The method may include: (i) receiving, by one or more processors and from at least one data source, input data representative of a user; (ii) generating, by one or more processors and using a first machine learning model, a user behavior pattern for the user based on the input data representative of the user; (iii) classifying, by one or more processors, the user behavior pattern based on one or more personas representative of user characteristics; (iv) identifying, by one or more processors and based on at least the input data and the one or more personas, an inefficiency in the user behavior pattern impacting a goal of the user; and (v) generating, by one or more processors and using a second machine learning model, a personalized recommendation for the user to remediate the inefficiency.

In another aspect, a computing device configured to generate predictive and event-based action recommendations is provided. The computing device may include one or more processors and a non-transitory computer-readable medium coupled to the one or more processors and storing instructions thereon that, when executed by the one or more processors, cause the computing device to: (i) receive, from at least one data source, input data representative of a user; (ii) generate, using a first machine learning model, a user behavior pattern for the user based on the input data representative of the user; (iii) classify the user behavior pattern based on one or more personas representative of user characteristics; (iv) identify, based on at least the input data and the one or more personas, an inefficiency in the user behavior pattern impacting a goal of the user; and (v) generate, using a second machine learning model, a personalized recommendation for the user to remediate the inefficiency.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIGS. 4-5 are flow diagrams of example methods to implement trigger-driven personalized recommendation systems, in accordance with some implementations of the present disclosure.

DETAILED DESCRIPTION

Figure 1A:
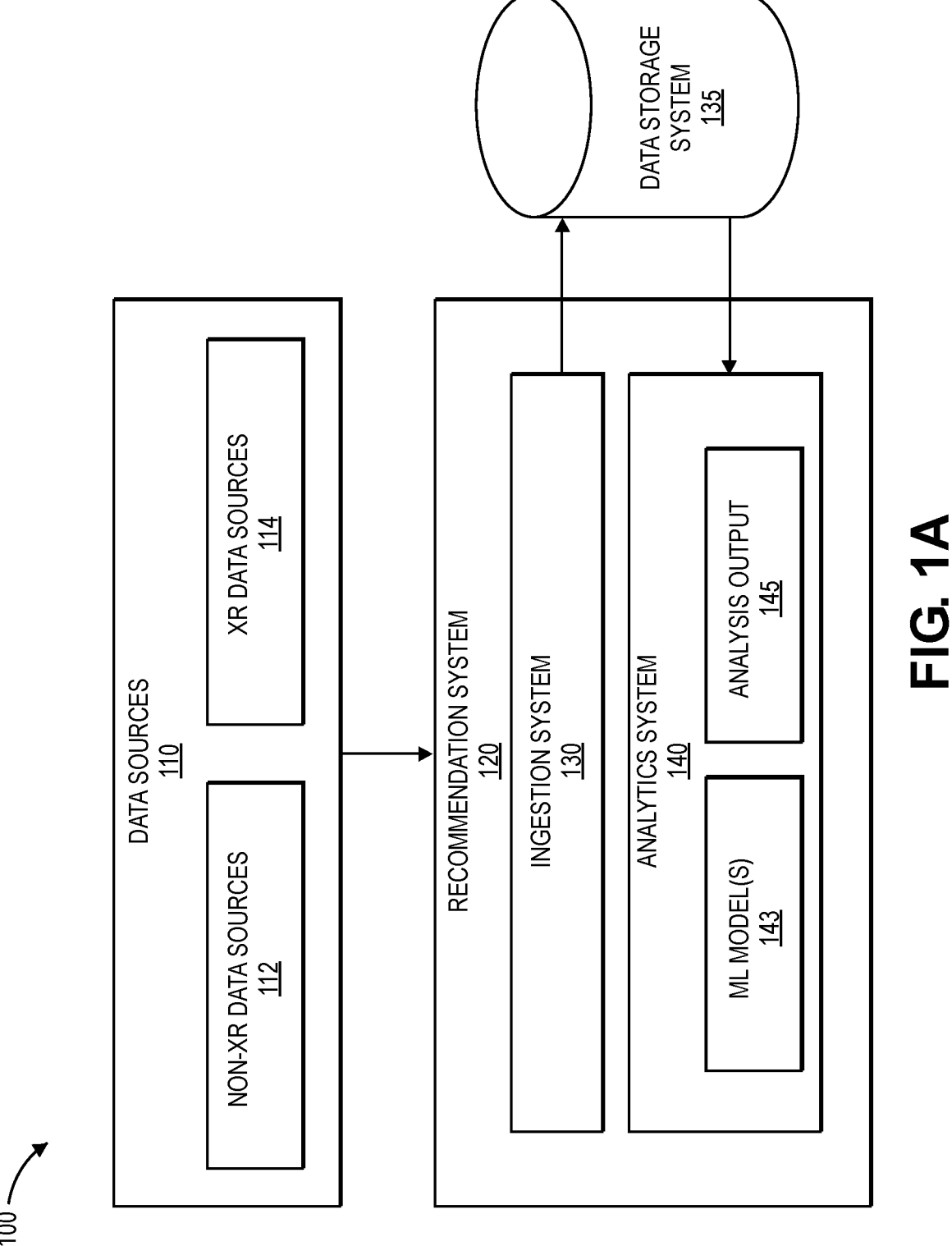
FIGS. 1A-2 are diagrams of example computer systems to generate trigger-driven personalized recommendations, in accordance with some implementations of the present disclosure.

Aspects of the present disclosure are directed to personalized recommendation systems to remediate inefficiencies in user behavior. A computing system can include multiple devices communicatively coupled via a network. The network can include one or more of: a local area network (LAN) to connect devices within a limited region (e.g., a building), a wide area network (WAN) to connect devices across multiple regions (e.g., using multiple LANs), etc. For example, a computing system can be an enterprise environment overseen by an enterprise (e.g., organization). An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software. Additionally or alternatively, an enterprise environment can include a remote subnetwork (e.g., cloud subnetwork) in which software is installed and executed on remote devices (e.g., server farm). An enterprise environment can be used to facilitate access to data and/or data analytics among devices of the private network.

Examples of devices of an enterprise environment can include client devices (e.g., user workstations), servers (e.g., web servers, email servers, high performance computing (HPC) servers, database servers and/or virtual private network (VPN) servers), etc. An enterprise can oversee a computing system that utilizes a variety of technology services in order to provide solutions and capabilities to users and clients. Examples of technology services include services that can implement and/or host technology services internally within a datacenter or other computing system (i.e., on-premises infrastructure). Additionally or alternatively, an enterprise can use remote services providers (e.g., cloud service providers) that implement and host technology services using remote infrastructure (e.g., remote servers). Examples of technology services include software as a service (SaaS), infrastructure as a service (IaaS), platform as a service (PaaS), etc. For example, enterprises can use third party vendors and/or suppliers to provide technology services. Enterprises may also own or partially own subsidiaries or affiliates who provide technology services.

Some enterprises can leverage user data to generate personalized products or solutions for users. The greater the amount of data available to an enterprise, the more personalized the product or solution that can be delivered. As a result, the ability to effectively manage and consume data has become essential for the success of an enterprise. The rapid growth of data, available from an ever-expanding number of touchpoints, however, has created challenges for enterprises in managing, accessing, and consuming the data.

By way of example, an enterprise may provide users with an advisory service. An advisory service can provide a user with guidance on how the user may be able to achieve a goal, such as a financial goal (e.g., maximize savings or minimize savings). The guidance can include products the user can use and/or actions that the user can take to help achieve the goal (e.g., maximize savings, minimize retirement spending). One example of such an advisory service is a retirement planning service.

An advisory service can be implemented using a recommendation system to provide personalized recommendations for the user. For example, a recommendation system can consider different features or attributes of a user. Based on such features and/or attributes, the recommendation system may generate a personalized recommendation as to what products the recommendation system recommends that the user should utilize and/or actions that the recommendation system recommends that the user should take to achieve a future goal (e.g., retirement goal). The recommendation system, for example, may provide different recommendations to the user based on basic demographic attributes of the user (e.g., age, ethnicity, etc.) and/or basic financial attributes of the user (e.g., annual income, total net worth, credit worthiness, etc.).

In some cases, the recommendation system may obtain and/or generate a profile of a user by analyzing data from different data sources. However, such data may be stored and/or retrieved in a number of different forms (e.g., varying in terms of data formatting, data quality, ease of use, etc.). Accessing and consuming data from different sources and/or in different forms in a timely manner may present a significant technical challenge to generating user profiles and, subsequently, recommendations based on the user profiles. Therefore, conventional recommendation systems primarily consider historical data from a limited number of sources, having varying degrees of quality. As such, conventional techniques generate a relatively limited profile of a user and, consequently, relatively generic recommendations for the user that are not appropriately or sufficiently tailored to the user.

Furthermore, some conventional systems utilize rule-based and/or algorithmic models to make a "personalized" recommendation for a user based on a profile of the user, which can rely heavily on historical data. Accordingly, it may be difficult or impossible to use rule-based and/or algorithmic models to generate personalized recommendations for users that are tailored to address user-specific criteria or changes in trends. Some recommendation systems may be further limited in that they are unable to account for broader trends exhibited by a cohort to which the user is determined to belong (e.g., generational trends). Additionally, some personalized plans are rigid and focused mainly on users as individuals, while neglecting the impact that other individuals who interact with the users have on such personalized plans, such as family, friends, communities, etc. Moreover, users may be incapable of taking a wide range of factors into account. In fact, it may be virtually impossible for individuals to predict how various factors can impact future decisions, such as externalities like climate change, natural disasters, political unrest, etc. It also may be difficult for a user to visualize the future offered by a personalized plan. Some recommendation systems, such as those that generate personalized recommendations based on future predictions (e.g., retirement plan recommendations), fail to provide a tangible, interactive and/or immersive experience for users. This can make it difficult for a user to properly envision the personalized recommendation, which can impact the ability of the user to fully appreciate the impact that the personalized recommendation may have on the user. Reliance on web-based views and/or mobile-based views can also limit the ability of the user to fully understand plan options and can lead to unsatisfying outcomes.

Additionally, a personalized recommendation can be generated in order to achieve a goal set for a user (e.g., retirement goal). It may be difficult or impossible for a user to identify how variables, such as past, current and/or future actions, will impact the goal and thus a personalized recommendation (e.g., personalized plan) generated for a user. For example, in the case of a personalized retirement plan recommendation for a user, it may be impossible for the user to determine how variables such as expenditures (e.g., daily, weekly, monthly and/or yearly) can impact retirement savings decades in the future. This is particularly true for expenditures that are small as a user may not be aware of how even small expenditures can affect future savings. Failure to take these variables into account can have a negative impact on a goal to be achieved via the personalized recommendation.

However, some recommendation systems fail to identify inefficiencies in user behavior that should be corrected to achieve a goal. Moreover, some recommendation systems fail to provide suggestions to users that can incentivize the users to take optimal actions towards achieving a goal. For example, in the case of retirement planning, some recommendation systems fail to provide suggestions to users that can incentivize users to increase savings, such as suggestions on how to optimize spending behaviors to maximize savings potential (e.g., making smaller expenditures now to prevent having to make larger expenditures later).

Aspects of the present disclosure address the above and other deficiencies by implementing personalized recommendation systems to remediate inefficiencies in user behavior. A personalized recommendation system described herein may be included within a computing system, which can be managed by an enterprise. For example, the personalized recommendation system can be implemented using a system driven by artificial intelligence and/or machine learning techniques as described herein.

Depending on the implementation, a personalized recommendation system described herein can identify, using at least one machine learning (ML) model, an inefficiency in user behavior that can impact at least one goal (i.e., target) set for a user. For example, a goal can be a future goal of the user. Illustratively, the goal can be a financial goal (e.g., savings goal or retirement goal). An inefficiency in user behavior can be identified by ingesting data collected from various data sources, and using at least one ML model trained to identify, from the ingested data, the inefficiency in the at least one goal. In some implementations, the at least one ML model is trained to identify an inefficiency in user behavior using pattern recognition. More specifically, the ingested data can include a set of attributes of the user, such as user likes, user dislikes, user activity, demographic information, financial information, etc. For example, the data collected from various data sources can include raw data, and the data ingestion processes the data such that the data is suitably formatted (e.g., via a ML model). Depending on the implementation, a data source can be an extended reality (XR) data source or a non-XR data source. In some implementations, the XR data source is or is associated with an XR system operated by a user. Examples of XR systems described herein include virtual reality (VR) systems, augmented reality (AR) systems, and mixed reality (MR) systems, though it will be understood that other such XR systems and/or combinations of such are also anticipated. In some implementations, a data source is a non-XR data source from which non-XR data pertaining to a user can be collected. Examples of non-XR data sources include websites, applications, client devices (e.g., laptops, mobile devices, desktops and/or tablets), Internet of Things (IoT) devices, servers, etc. Further details regarding data sources and data ingestion will be described in further detail herein.

A personalized recommendation system described herein can generate, using at least one ML model, a personalized recommendation for a user, the recommendation determined to remediate the inefficiency. The personalized recommendation can include a recommended action that the user should take that would increase behavior efficiency and put the user in a better position to achieve the at least one goal.

Illustratively, user behavior can include financial behavior, such as spending and/or saving behavior. A personalized recommendation system can identify, from input data, an inefficiency in financial behavior of a user that impacts at least one financial goal of the user, and subsequently generate a personalized recommendation to remediate the inefficiency. Examples of financial goals include retirement goals, higher education savings goals, etc. Input data used to identify an inefficiency can include ingested data collected from various electronic sources, such as electronic bank accounts (e.g., credit and debit card accounts, deposit accounts), electronic retirement accounts, cryptocurrency accounts, etc. Input data can be received manually from a user via a user interface (e.g., the user provides information about spending habits via the user interface). The personalized recommendation system can use at least one ML model to identify an inefficient financial pattern (e.g., spending pattern or savings pattern) from the input data. An inefficient financial pattern can reflect a spending behavior having a negative impact on a retirement goal.

The personalized recommendation system can then generate a personalized recommendation to replace the inefficient financial pattern with a more efficient financial pattern to achieve the at least one financial goal (e.g., minimize overall spending and/or maximize savings). Such personalized recommendations can be used to help achieve a retirement goal.

For example, a personalized recommendation can be a recommendation for the user to save, transfer, and/or contribute funds to a financial account. For example, a personalized recommendation system can allocate an amount of spending to a retirement account, which can promote a savings behavior that emphasizes spending to increase retirement contributions. The amount of spending can be a predefined amount of spending, a fractional amount of spending, etc.

As another example, a personalized recommendation can be a recommendation for the user to optimize spending behaviors. For example, the personalized recommendation system can predict expenses made by the user that could be avoided or reduced in size and/or purchase frequency. To illustrate, the personalized recommendation system may identify that a user is inefficiently driving to a grocery store multiple times a week for groceries (e.g., by analyzing credit card data showing multiple trips to at least one grocery store or supermarket during the week), and subsequently recommend that the user go grocery shopping once per week to reduce fuel consumption. In further such examples, the personalized recommendation system may further include recommendations for techniques to improve efficiency (e.g., generating a list of common purchases for the user As yet another example, a personalized recommendation can be a recommendation to adjust the frequency and/or nature of expenditures to increase savings. For example, a personalized recommendation system can identify expenditures made by a user for luxury items and/or non-luxury items. The personalized recommendation system can provide a recommendation to the user to save more when making infrequent luxury purchases, such as buying a ring or a car, while also planning for more frequent luxury purchases, such as ordering out for dinner. Conversely, when making non-luxury expenditures such as purchases for everyday essentials like groceries, less savings may be required. No retirement savings are needed for infrequent medical expenses.

As yet another example, a personalized recommendation can be a recommendation regarding how to spend money now to increase savings over time. For example, a personalized recommendation system can identify, from input data, an asset owned by a user, and subsequently generate a personalized recommendation for the user to maintain the asset in order to prevent more major expenditures on the asset later. To illustrate, the personalized recommendation system can determine that a user is a homeowner (e.g., by analyzing user data using at least one ML model, from data manually entered by the user via a user interface identifying the user as a homeowner, etc.). Upon making the determination, the personalized recommendation system can generate at least one personalized recommendation regarding how to spend money toward maintaining the home to increase savings over time (e.g., recommending a schedule of when to replace an air filter of a heating, ventilation, and air conditioning (HVAC) system to improve HVAC efficiency).

As another illustration, the personalized recommendation system can determine that a user owns a vehicle (e.g., by analyzing user data using at least one ML model, from data manually entered by the user via a user interface identifying the user as a vehicle owner, etc.). Upon making that determination, the personalized recommendation system can generate a personalized recommendation regarding how to spend money toward maintaining the vehicle to increase savings over time by preventing more expensive vehicle repairs in the future (e.g., recommending preventative maintenance of the vehicle, such as oil changes, filter replacements, and/or brake maintenance). Further details regarding personalized recommendation systems to remediate inefficiencies in user behavior will now be described below with reference to FIGS. 1A-6.

Moreover, the personalized recommendation system may explain, teach, and/or otherwise illustrate to a user (e.g., through generated recommendations and/or through provided graphics, videos, images, textual representations, etc.)

details behind and/or associated with the recommendations generated for the user. For example, the personalized recommendation system may generate recommendations based at least on the principles that a user can spend more money to save more money, organized behavior can lead to greater savings, and early compound growth can increase savings potential over time.

Advantages of the present disclosure include, but are not limited to, improved recommendation system performance. For example, implementations described herein can enable the creation of customized and personalized recommendations (e.g., plans) that provide more relevant information to users. As another example, implementations described herein can improve recommendations and/or digital representations by receiving and analyzing data derived from both non-XR and XR data sources. As yet another example, implementations described herein can continuously learn the behavior of a user from user interactions with respect to both XR and non-XR sources and can adjust a recommendation and/or digital representation for the user based on behavior and preferences. As such, the system can ensure that the recommendation and/or digital representation remains relevant and customized to user preferences, which may evolve over time. As yet another example, by using ML models that can be agnostic to user segments, implementations described herein can eliminate historical biases that may be present in recommendations (e.g., personalized plans) made by recommendation systems (e.g., generate more objective recommendations). As yet another example, by utilizing user similarity and immersive user experiences, implementations described herein can provide users with unique and novel experiences (e.g., virtual or digital experiences) that may not have been otherwise discovered.

FIG. 1A illustrates an example computing system ("system") 100 including a personalized recommendation system to remediate inefficiencies in user behavior, in accordance with at least one embodiment. In some implementations, system 100 is managed by an enterprise. System 100 can include a set of data sources 110 that provide user data related to at least one user. Examples of user data include health and wellness data, financial data, demographic data, and miscellaneous data. Examples of health and wellness data include activity data, heart rate data, blood pressure data, pulse data, oximeter data, etc. Examples of financial data include spending pattern data, economic indicator data, market trend data, income data, expense data, savings rate data, investment performance data, investment allocation data, retirement plan contribution data, retirement account balance data, entitlement benefit data (e.g., Social Security and/or defined benefit plan), investment return data, healthcare cost data, withdrawal strategy data, tax rate data, housing cost data, etc. Examples of miscellaneous data include travel or vacation data, regulatory data, etc.

Data sources 110 can include physical devices, software applications, data resources, etc. That may provide data or access thereto. Data sources 110, for example, may include server devices (e.g., web servers, database servers, file servers, on-premise or in the cloud, etc.), client devices (e.g., laptop computers, desktop computers, cell phones, tablets, wearables, or other devices), Internet of Things (IoT) devices, or other devices; websites, web applications, mobile applications (e.g., running on a client device), enterprise applications, or other applications; file stores, file repositories, or databases; or other such data resources.

Data sources 110 may provide data (or access to data resources) through one or more outwardly facing interfaces (e.g., exposed to a private intranet, the public Internet, a cellular data network, a satellite data network, or other data network). Data sources 110, for example, may provide data (or access to data resources) via software applications or services running on the data source 110 or on a device associated with the data sources 110 (e.g., servers, mobile devices, IoT devices, etc.). A particular data source of data sources 110 (or device associated therewith), for example, may be running a server that a client (e.g., a client application running on the event-driven predictive modeling and recommendation system 100) may be able to communicate with using a suitable communication protocol. Data sources 110, for example, can include a website or web application hosted on a web server (e.g., an HTTP, HTTPS or FTP server) that a client may communicate with using a suitable communication protocol, such as the Hypertext Transfer Protocol (HTTP), Hypertext Transfer Protocol Secure (HTTPS), or File Transfer Protocol (FTP). A client may send a request to the web server, which may process the request and send a response (e.g., containing the data of interest) back to the client.

In some cases, a data source 110 may provide data (or access to data resources) via a web service or application programming interface (API), including for example, a simple object access protocol (SOAP), a representational state transfer (REST or RESTful), an HTTP, a WebSocket, or another web service or API. By way of example, data sources 110 may include database resources (e.g., a relational or non-relational database, such as a SQL or NoSQL database) that may be accessed through a database service or API of the server hosting the database (e.g., a Java database connectivity (JDBC) interface, an open database connectivity (ODBC) interface, an object linking and embedding database (OLE or OLEDB) interface, an ADO.NET interface, or another database interface).

For example, data sources 110 can include set of non-XR data sources 112 that are sources of non-XR data for the user. Examples of non-XR data that can be obtained from non-XR data sources include data obtained from social media channels, data obtained from financial websites, data obtained from email accounts, data obtained from online surveys, data obtained from travel or vacation websites, health and wellness data, etc. Additionally or alternatively, set of data sources 110 can include the set of XR data sources 114 that are sources of XR data for the user. For example, the set of XR data sources 140 can include at least one XR system, which can include at least one of: a VR system, an AR system, an MR system, etc. XR data for a user can be obtained through an XR system operated by the user. For example, in the case of a VR system, the VR system can enable access to a virtual environment that can include one or more virtual worlds that provide an immersive virtual experience for users. More specifically, each virtual world can be a 3D virtual space accessible to the user, where the user can interact with other users and with digital objects in the 3D virtual space. The user can create a virtual avatar that represents the user within a virtual world. Once inside a virtual environment, a user can perform various different types of activities, such as exploring the virtual environment, socializing with other users who are currently present within the virtual environment, participating in games and activities supported by the virtual environment, buying and selling virtual goods within a virtual marketplace supported by the virtual environment, etc. A virtual environment can be generated and maintained using a combination of technologies, such as ML, blockchain, metaverse techniques, etc. Depending on the implementation, such technologies can enable the creation and storage of large amounts of data that can be used to populate the virtual worlds with virtual content, such as virtual objects, virtual avatars, virtual buildings, etc. For example, XR data can be collected from virtual interactions by the user in the virtual world, such as via interactions during virtual events, within virtual communities or marketplaces, etc.

Similarly, an AR system may project an augmented environment into the real world by streaming or otherwise providing a feed of the surrounding real environment to the user while generating an overlay consisting of overlapping virtual items, avatars, locations, etc. Similarly to the virtual environment, the augmented environment may allow for similar activities as in the virtual environment, such as exploring the augmented environment, socializing with other users who are currently appearing within the augmented environment, participating in games and activities supported by the augmented environment, buying and selling virtual goods within a virtual marketplace supported by the augmented environment, etc., and may therefore provide similar XR data as the VR system. Moreover, an MR system may project a mix of the augmented and virtual environments, allowing a user to swap between the two and/or melding the two to provide a preferred environment to the user. As such, an MR system may provide similar XR data as the VR and AR systems described above. Therefore, it will be understood that the term "virtual world" may equally apply to any environment generated by any such XR system as described herein unless specified to the contrary.

Accordingly, XR data can be used to identify user preferences, behaviors, social connections, etc. In the virtual world. For example, with reference to FIG. 1B, a set of non-XR data sources 112 can include at least one of: website 150, application 152, client device 154 (e.g., laptop, mobile device, a desktop and/or a tablet), IoT device 156 (e.g., wearable device), etc., and the set of XR data sources 114 can include at least one XR system 158. An example XR system 158 will be described below with reference to FIG. 2.

Referring back to FIG. 1A, data sources 110, for example, may provide objective and/or subjective information regarding users (e.g., reflecting the preferences, goals, values, social connections and interactions, physical well-being, financial well-being, and/or other attribute of a user) as well as general data regarding the world(s) with or in which the users may live or interact (e.g., reflecting societal, environmental, and/or economic conditions of the world(s)). Data sources 110, for instance, may include internal data sources of an enterprise operating system 100 as well as external data sources of third-party enterprises.

Data sources 110 may provide different types of data, including for example, text data, audio data, visual data (e.g., images, video, animation), map data, graph data, or other types of data. In some cases, data sources 110 may also provide metadata that may describe other data provided by the data source 110. The data provided by a data source of data sources 110 may be structured data, unstructured data, or semi-structured data. Structured data may be data that is organized in a known manner, for example, according to a prescribed data model. A data model may define an organization of data elements, how they relate to one another, and/or their correspondence to properties of real-world entities. A data model, for instance, may specify that a data element representing a user is to be composed of a number of other elements representing different features or attributes that may characterize the user (e.g., demographic attributes, financial attributes, preference attributes, or other relevant attributes of the user). Structured data, for instance, may be data that is organized according to a relational model, such as data stored in a relational database (e.g., as a series of records comprising a defined set of fields or elements). Unstructured data (or unstructured information) may be data or information that does not conform to a pre-defined data model and/or is not organized in a pre-defined manner (e.g., free form text). Semi-structured data may be data that may not conform to a particular organizational structure (e.g., a tabular structure of data models associated with relational databases or other forms of data tables), but nonetheless contains markers (e.g., tags, labels, or the like) that separate semantic elements within the data and establish a hierarchy within the data (e.g., of records and fields).

Data sources 110 may include data sources associated with a user (or group of users) as well as general data sources that may not be associated with a particular user (or group of users). Data sources 110 associated with a user may be data sources 110 that provide data (or information) regarding a user and/or the life/lifestyle of the user. The data provided by data sources 110 may collectively or individually help to provide a complete or partial picture of a user and the user life/lifestyle. The data collected from data sources 110 may collectively or individually provide a picture of the user and the user life/lifestyle across time (e.g., at different points or stages during the user life). Data sources 110 associated with a user, for example, may provide data reflecting the preferences, goals, values, social connections and interactions, physical well-being, financial well-being, and/or other attribute of a user or other attribute of their life.

Data sources 110 associated with a user may include data sources associated with a virtual and/or real-world presence of a user, providing, for example, data regarding the interactions of the user in the real-world and/or one or more virtual world(s). Data sources 110 associated with a user, for example, may include data sources of third-party enterprises or organizations with which a user may interact (e.g., third-party websites, applications, or services maintained and/or provided by such enterprises or organizations). Similarly, the data sources 110 associated with a user may include data sources associated with virtual world(s) in which a user may interact (e.g., through websites or applications associated with such virtual worlds). The virtual world(s) may include, for instance, virtual events, virtual communities, virtual marketplaces, or the like. Data sources 110 associated with a user may provide various types of data, such as demographic data, personal financial data (e.g., income data, spending data, expense data, investment data, etc.), health and wellness data (e.g., hear rate data, pulse rate data, oximeter data, or other activity level data), social interaction data (e.g., from social media channels and/or email), travel or vacation data (e.g., from common carrier websites and/or booking platforms), or other real-world and/or virtual world data regarding the user.

Data sources 110 can include data sources that are not associated with a particular user (or group of users) that may provide general data, for example, regarding the real-world and/or virtual world(s) with or in which a user may interact. Data sources 110, for instance, may provide data regarding the societal, environmental, and/or economic conditions, or other relevant aspects, of the real-world and/or virtual world (s) in which the user may interact. Data sources 110 may include data sources of third-party enterprises or organizations (e.g., third-party websites, applications, or services maintained or provided by such enterprises or organizations), such as data sources of news and media outlets, governmental agencies, financial institutions, or the like. Data sources 110, for example, may provide data regarding public security markets, economic indicators, market trends, government censuses, government regulations, savings rates, income tax rates, geopolitical events, environmental or geological changes, etc.

In some implementations, data sources 110 include internal data sources. One example of an internal data source is an enterprise data source. Enterprise data sources may include data sources maintained by the organization operating system 100. The enterprise data sources may contain data that is generated, captured, and/or collected by the organization. The enterprise data sources, for example, may contain data regarding one or more users with whom the organization may have and/or have had a relationship. The enterprise data sources of a financial services organization, for example, may contain data regarding users that have used and/or currently use one or more services offered by the organization (e.g., banking, investing, retirement, and/or advisory services). The enterprise data sources, for instance, may contain basic personal information regarding the user, such as demographic information (e.g., age, ethnicity, etc.) and/or personal identification information (e.g., name, address, driver's license number, Social Security Number (SSN), etc.). The enterprise data sources may also contain information regarding the services of the organization that were or are being used by the user (e.g., account numbers, statements, transaction histories, or other records). In some cases, a user may have had a relationship with the organization over a period of time, and so the data contained in enterprise data sources may provide data regarding the users at various points in time (e.g., at various stages during the user life). The above example(s) are merely illustrative of the data that may be provided by enterprise data sources, and enterprise data sources may provide other types of data regarding a user.

The enterprise data sources may also contain information that a user provided to the organization when enlisting in the recommendation service. A user, for instance, may have been asked to fill out a form, a questionnaire, or an application (generically, form), in which the user may have been asked to provide basic personal information along with answers to one or more questions, the responses to which may be used by system 100 to provide personalized recommendations to the user. A user, for example, may have been asked to and provided details regarding a profession or occupation (e.g., nurse, professor, engineer, etc.), financial situation (e.g., annual income, total net worth, credit worthiness, etc.), marital and/or family status, or the like. The user may have also been asked to and provided details regarding future goals and/or aspirations, for example, planned educational pursuits (e.g., plans to attend a college or trade school, or pursue a graduate degree), career ambitions (e.g., desire to change careers), expected retirement age (e.g., 50 years of age, 65 years of age, etc.), desired retirement location, or the like. In some cases, the user may have also been asked to and provided details regarding interests (e.g., hobbies, routine activities, etc.), preferences (e.g., likes and/or dislikes, relative preferences, etc.), including communication preferences (e.g., mail, telephone, electronic mail (or e-mail), text message, social media message, etc.), or other relevant information. In some cases, the information requested and/or questions included in an enrollment form may be generated based on the different models used by system 100. In this way, the responses provided by the user can help drive the models to produce more personalized recommendations. The above example(s) are merely illustrative, and the organization may have solicited and collected responses regarding any number of relevant dimensions of the user, which the enterprise data sources may have captured and be able to provide.

In some implementations, data sources 110 include external data sources, such as user data sources and general data sources. User data sources may include data sources of third-party enterprises or organizations that may capture and/or collect data regarding a user. A user may choose to and/or authorize system 100 to access user data sources (e.g., when enlisting in the personalized recommendation service). The user data sources, for example, may include data platforms associated with websites, applications, and/or services of third-party enterprises or organizations with which a user may interact. The user data sources, for example, may include data platforms of financial services providers with whom the user has a relationship (e.g., of banking, credit card, insurance, retirement, or brokerage service providers). Financial services providers, for example, may collect financial information regarding a user (or personal financial data), including income, spending, expenses, investment accounts (e.g., balance, contributions, withdrawals, transactions, performance, etc.), entitlement benefits (e.g., Social Security, pension, and/or other defined benefit plans), or other personal financial data. As another example, user data sources may include data platforms associated with health and/or wellness service providers with whom the user has a relationship (e.g., doctors, hospitals, insurance providers, wearable devices platforms, etc.). Health and/or wellness service providers, for example, may collect medical record data (e.g., patient records, health insurance records, etc.), activity data (e.g., heart rate data, pulse rate data, oximeter data, etc.), or other health and wellness data. As yet another example, user data sources may include data platforms associated with social media channels on which the user may interact. The social media channel platforms may provide conversational data (e.g., between the user and others), reaction data (e.g., likes, dislikes, or other reactions to a message, picture, post, etc.), or other interaction data. The above example(s) are merely illustrative of the data that may be provided by user data sources, and user data sources may provide other types of data regarding a user.

In further implementations, data sources 110 can additionally include data sources of third-party enterprises or organizations that may generate, capture, and/or collect data regarding societal and/or environmental conditions in different countries across the world or the world as a whole. Data sources 110 can include publicly or privately accessible data sources of third-party enterprises or organizations. Data sources 110, for example, may include data platforms associated with websites, applications, and/or services of news and media outlets, financial institutions, or governmental agencies. These data platforms can store and/or host data regarding public security markets, economic indicators, market trends, healthcare costs, government censuses, government regulations, savings rates, income tax rates, geopolitical events, environmental or geological changes, or other societal and/or environmental data. The above example(s) are merely illustrative and data sources 110 may provide other types of data.

System 100 can further include recommendation system 120. Recommendation system 120 can identify, based on data from data sources 110, an inefficiency in behavior of a user, and generate personalized recommendation for the user based on the data from data sources 110. In some implementations, recommendation system 120 generates personalized recommendations as to products or services offered by an enterprise that a user may want to use, actions the user may take, and/or behaviors that the user may change or engage in to better position the user and/or other individuals associated with the user (e.g., a child, spouse, sibling, parent, etc.) to meet at least one goal (e.g., savings or retirement goal). For example, a retirement goal can be a minimum amount of retirement savings, a target retirement age, etc.

In some implementations, the recommendation system 120 includes ingestion system 130 to ingest data from various different data sources 110. Ingestion refers to the collection and importation of data from set of data sources 110 for storage into a data storage system (e.g., database), such as data storage system 135. Ingestion system 130 can employ a set of data ingestion tools to perform data ingestion. For example, the set of data ingestion tools can include one or more APIs. In some implementations, ingestion system 130 ingests data regarding users with whom the enterprise may have and/or have had an existing relationship (e.g., from one or more internal data sources), including for example, demographic and/or personal identification information for each user as well as information regarding the services of the organization that were and/or are being used by each user. Ingestion system 130 may also ingest data regarding information that existing users, as well as new users, may have provided to the enterprise when registering to use system 100.

Depending on the implementation, data ingestion can involve a number of stages, which can include extraction, transformation, and loading ("ETL"). During the extraction stage, user data identified from a set of data sources pertaining to the user is extracted. The user data may be extracted from various different data sources (e.g., non-XR and/or XR) and/or in various different data formats or types. Examples of data formats include structured data, semi-structured data, or unstructured data. Examples of data types include API feeds, database queries, Portable Document Format (PDF) files, word processing document files, table-structured format files (e.g., comma-separated value (CSV) files), read-only API access to technology assets and data sources such as a public cloud infrastructure, etc.

In some implementations, extracting data from set of data sources 110 includes performing data digitization. Data digitization refers to a process of converting analog information included in a non-digital medium (e.g., physical documents, physical photographs, audio recordings and/or video recordings) into a digital format from which data can be extracted. For example, a digital format can be an electronic document, an image file, an audio file, a video file, etc.

Figure 1B:
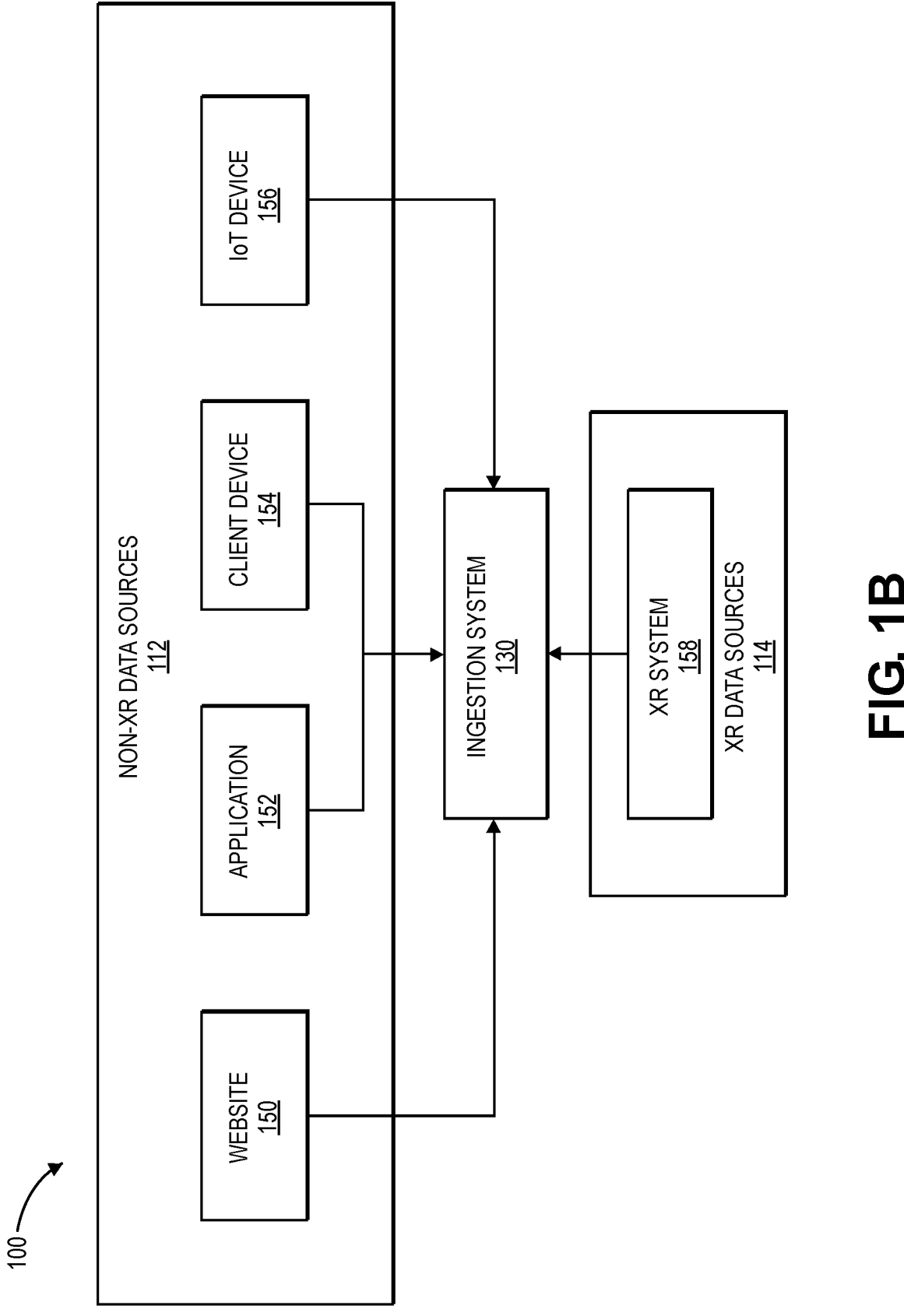

Data can be extracted from website 150 and/or application 152 of FIG. 1B by using a scraping tool (e.g., program or script). A scraping tool can be used to access and extract data from source code. For example, data can be extracted from website 150 and/or application 152 using an API of website 150 and/or application 152, and/or by using a special purpose tool or programming language.

Data can be extracted from IoT device 156 of FIG. 1B by using a suitable IoT communication protocol. One example of an IoT communication protocol is Message Queuing Telemetry Transport (MQTT). MQTT is a messaging protocol that can be used to transmit messages from IoT device 156 to an external computing device (e.g., recommendation system 120) (and vice versa). MQTT operates using a publish/subscribe model, in which messages are published to a topic, and any device that has subscribed to that topic will receive the message. Another example of an IoT communication protocol is Constrained Application Protocol (CoAP). CoAP is a messaging protocol designed for use with constrained IoT devices, which are IoT devices that are capable of operating under resource constraints (e.g., processing, memory, energy and/or network). Constrained IoT devices can be configured to perform specific tasks with minimal resource consumption. For example, a constrained IoT device can be a small, embedded device (e.g., a sensor and/or actuator), which can be used in industries and/or products such as smart appliances, wearable technology, and industrial automation. CoAP operates using a client/server model, in which a client can send a request to a server, and the server will send a response back. MQTT can also be used with constrained IoT devices. Both MQTT and CoAP can be used to enable communication between IoT device 156 and recommendation system 120 in environments with limited bandwidth and limited network connectivity (e.g., unreliable network connections).

During the transformation stage, the extracted data is transformed to generate transformed data. The transformed data has a data format suitable for use by the recommendation system to generate a personalized recommendation for a user. For example, the transformed data can have a format suitable for use by an ML model trained to generate a personalized recommendation for a user based on the transformed data. Transforming data can include performing data curation, data integration, data cleaning, data duplication, data de-duplication, data validation, data normalization and/or or data enrichment. In some implementations, transforming the extracted data includes generating an ML model using the extracted data. For example, generating the ML model can include training an ML model based on the extracted data, or updating an ML model (e.g., retraining a previously trained ML model) based on the extracted data. Further details regarding ML models are described below.

In some implementations, transforming the extracted data includes performing data codification. Data codification refers to a process of assigning codes (e.g., symbols) to data that represent respective data attributes, which can be used to organize (e.g., categorize) the data and/or transform the data for further analysis. Codes can be numerical, alphabetical, and/or alphanumerical. Mappings between codes and the respective data attributes that the codes represent can be maintained within a codebook.

In some implementations, transforming the extracted data includes performing natural language processing (NLP). NLP refers to techniques that can enable computers to understand and/or generate human-interpretable language. Performing NLP can include transforming raw text data into processed text data having a data format suitable for analysis, identifying meaning and intent from the processed text data (i.e., language understanding), generating natural language text from non-language data, such as data from sensors, databases, etc. Text preprocessing can include at least one of tokenization, part-of-speech tagging, named entity recognition, etc. Language understanding can include at least one of parsing, sentiment analysis, semantic reasoning, topic modeling, text classification, etc. Language generation can include at least one of text summarization, machine translation, etc.

The transformed data may also be curated for further processing by recommendation system 120, for example, by performing one or more operations to identify relevant data (e.g., with respect to a goal or objective for which a recommendation may be given), abstract the data (for instance, to groups of users (e.g., by generating and enriching representative personas)), organize the data (e.g., filter and/or segregate the data for training and/or performing inferencing using different models), and/or streamline the data (e.g., reduce a size or dimensionality of the data used for training and/or performing inferencing using particular models) for efficient use by recommendation system 120.

During the loading stage, the transformed data is loaded into data storage system 135 (e.g., a database). Data storage system 135 can be on-premises storage, remote storage (e.g., cloud storage), etc. For example, loading transformed data can include performing batch processing or real-time streaming. Batch processing is a type of data processing in which data is collected, processed, and analyzed in batches, typically at scheduled intervals. In the context of data ingestion, batch processing can include temporarily storing transformed data in a buffer or staging area, and then processing the transformed data in batches at predetermined times. In contrast to batch processing, real-time streaming in a type of data processing in which data is collected, processed and analyzed in real-time or near real-time as the data is generated. In the context of data ingestion, real-time streaming can be used in applications. Batch processing can be a cost-effective way to process large amounts of data while minimizing resource usage in some data processing applications. Real-time processing can utilize more resources than batch processing. However, real-time processing can provide benefits that outweigh the costs in some applications that would improve from real-time or near real-time data-driven insights, such as real-time or near real-time cybersecurity monitoring. In some implementations, data storage system 135 is a smart data storage system that ingests and processes raw data collected from data sources 110. To ensure privacy of personal information, ingested data representative of a user can be encrypted and/or transmitted using end-to-end encryption. Additionally, data storage system 135 can be a secure data storage system (e.g., secure data warehouse).

The recommendation system 120 can further include analytics system 140 that can analyze ingested data representative of a user to generate analysis output 145. For example, the ingested data can be obtained at least from data storage system 135. The ingested data can include data ingested from XR and/or non-XR sources. Analysis output 145 can include a personalized recommendation for the user that addresses an inefficiency identified from the ingested data.

In some implementations, analytics system 140 generates a user profile for the user based on the ingested data. For example, analytics system 140 can use at least one ML model to identify and/or determine various features or attributes about the user from the ingested data. A user profile can include different demographic attributes, financial attributes, preference attributes, or other relevant attributes of the user, which may help to characterize the user, user behavior (e.g., financial behavior), and/or user needs (e.g., financial needs). Analytics system 140 can consider such different features or attributes to generate a personalized recommendation for the user. In some embodiments, system 100 may also consider a broader cohort to which the user may belong, which may help improve personalized recommendations generated by the recommendation system 120.

In some implementations, the input data representative of the user is analyzed in real time or near real-time to identify an inefficiency in behavior of a user and to generate a personalized recommendation for the user to remediate the inefficiency. More specifically, analytics system 140 can use at least ML model that is trained to generate the personalized recommendation for the user using the input data. In some implementations, analyzing the input data includes perform-ing predictive modeling using the ML model(s). Predictive modeling refers to using a ML model to make predictions about future events or trends based on input data. For example, a ML model can be trained by associating input training data representative of respective users, to respective output recommendations determined to be optimal for the input training data. A ML model can be trained using a training dataset including historical data (e.g., labeled data and/or unlabeled data), with the goal of teaching the ML model to identify relationships between input data and output data corresponding to future events or trends. Thus, the at least one ML model can be trained to generate, for input data representative of a user, a recommendation that is predicted to be optimal for the user for the input data. Further details regarding training ML models are described below.

The at least one non-XR data source can include at least one electronic account or user application (e.g., email account, financial account, calendar and/or social media account). The user can the grant system 100 permission to access the at least one electronic account (e.g., by linking to system 100). User data can include emails, calendar entries, social media posts, financial transactions, etc., from which the at least one ML model can recognize patterns that reflect user behavior. As another example, the at least one data source can include an XR data source. Analytics system 140 can recognize patterns from user data obtained from the XR data source.

In some implementations, an event identified by analytics system 140 is stored in at least one data storage system 135. For example, the at least one data storage system 135 can include an event repository for securely storing and organizing events for a user identified by analytics system 140. The event repository can provide a comprehensive view of the events identified for the user and can allow for retrieval of event information by users via a user interface (e.g., secure user interface).

Illustratively, user behavior can include financial behavior, such as spending and/or saving behavior. Analytics system 140 can identify, from input data, an inefficiency in financial behavior of a user that impacts at least one financial goal of the user, and subsequently generate a personalized recommendation to remediate the inefficiency. Examples of financial goals include retirement goals, higher education savings goals, etc. Input data used to identify an inefficiency can include ingested data collected from various electronic sources, such as electronic bank accounts (e.g., credit and debit card accounts, deposit accounts), electronic retirement accounts, cryptocurrency accounts, etc. Input data can be received manually from a user via a user interface (e.g., the user provides information about spending habits via the user interface). Analytics system 140 can use at least one ML model to identify an inefficient financial pattern (e.g., spending pattern or savings pattern) from the input data. An inefficient financial pattern can reflect a spending behavior having a negative impact on a retirement goal.

In some implementations, analytics system 140 uses a generative model (e.g., large language model (LLM)) trained on a corpus of event data to stop hallucination propagation. For example, by training the generative model on a large corpus of event data, hallucinations may be less likely and/or may be easier for a module of the analytics system 140 (e.g., as discussed below with regard to FIG. 3) to detect and/or correct.

Analytics system 140 can then generate a personalized recommendation to replace the inefficient financial pattern with a more efficient financial pattern to achieve the at least one financial goal (e.g., minimize overall spending and/or maximize savings). Such personalized recommendations can be used to help achieve a retirement goal.

For example, a personalized recommendation can be a recommendation for the user to save, transfer, and/or contribute funds to a financial account. For example, analytics system 140 can allocate an amount of spending to a retirement account, which can promote a savings behavior that emphasizes spending to increase retirement contributions. The amount of spending can be a predefined amount of spending, a fractional amount of spending, etc.

As another example, a personalized recommendation can be a recommendation for the user to improve spending behaviors. For example, analytics system 140 can predict expenses made by the user that could be avoided, or reduced in size and/or purchase frequency. To illustrate, analytics system 140 may identify that a user is inefficiently driving to a grocery store multiple times a week for groceries (e.g., by analyzing credit card data showing multiple trips to at least one grocery store or supermarket during the week) and recommend that the user go grocery shopping once per week to reduce fuel consumption.

As yet another example, a personalized recommendation can be a recommendation to adjust the frequency and/or nature of expenditures to increase savings. For example, analytics system 140 can identify expenditures made by a user for luxury items and/or non-luxury items. Analytics system 140 can provide a recommendation to enable the user to save more when making infrequent luxury purchases, such as buying a ring or a car, while also planning for more frequent luxury purchases, such as ordering out for dinner. Conversely, when making non-luxury expenditures such as purchases for everyday essentials like groceries, the analytics system 140 may determine that fewer savings are required. Similarly, the analytics system 140 may determine that no retirement savings are needed for infrequent medical expenses.

As yet another example, a personalized recommendation can be a recommendation regarding how to spend money now to increase savings over time. For example, the analytics system 140 can identify, from input data, an asset owned by a user, and generate a personalized recommendation for the user to maintain the asset in order to prevent more and/or larger expenditures on the asset later. To illustrate, analytics system 140 can determine that a user is a homeowner (e.g., by analyzing user data using at least one ML model, from data manually entered by the user via a user interface identifying the user as a homeowner, etc.). Upon making such a determination, analytics system 140 can generate at least one personalized recommendation regarding how to spend money toward maintaining the home to increase savings over time (e.g., recommending a schedule that the analytics system 140 determines to be optimal timing of when to replace an air filter of a heating, ventilation, and air conditioning (HVAC) system to improve HVAC efficiency). As another illustration, analytics system 140 can determine that a user owns a vehicle (e.g., by analyzing user data using at least one ML model, from data manually entered by the user via a user interface identifying the user as a vehicle owner, etc.). Upon making such a determination, analytics system 140 can generate a personalized recommendation regarding how to spend money toward maintaining the vehicle to increase savings over time by preventing more expensive vehicle repairs in the future (e.g., recommending preventative maintenance of the vehicle, such as oil changes, filter replacements, and/or brake maintenance).

Figure 2:
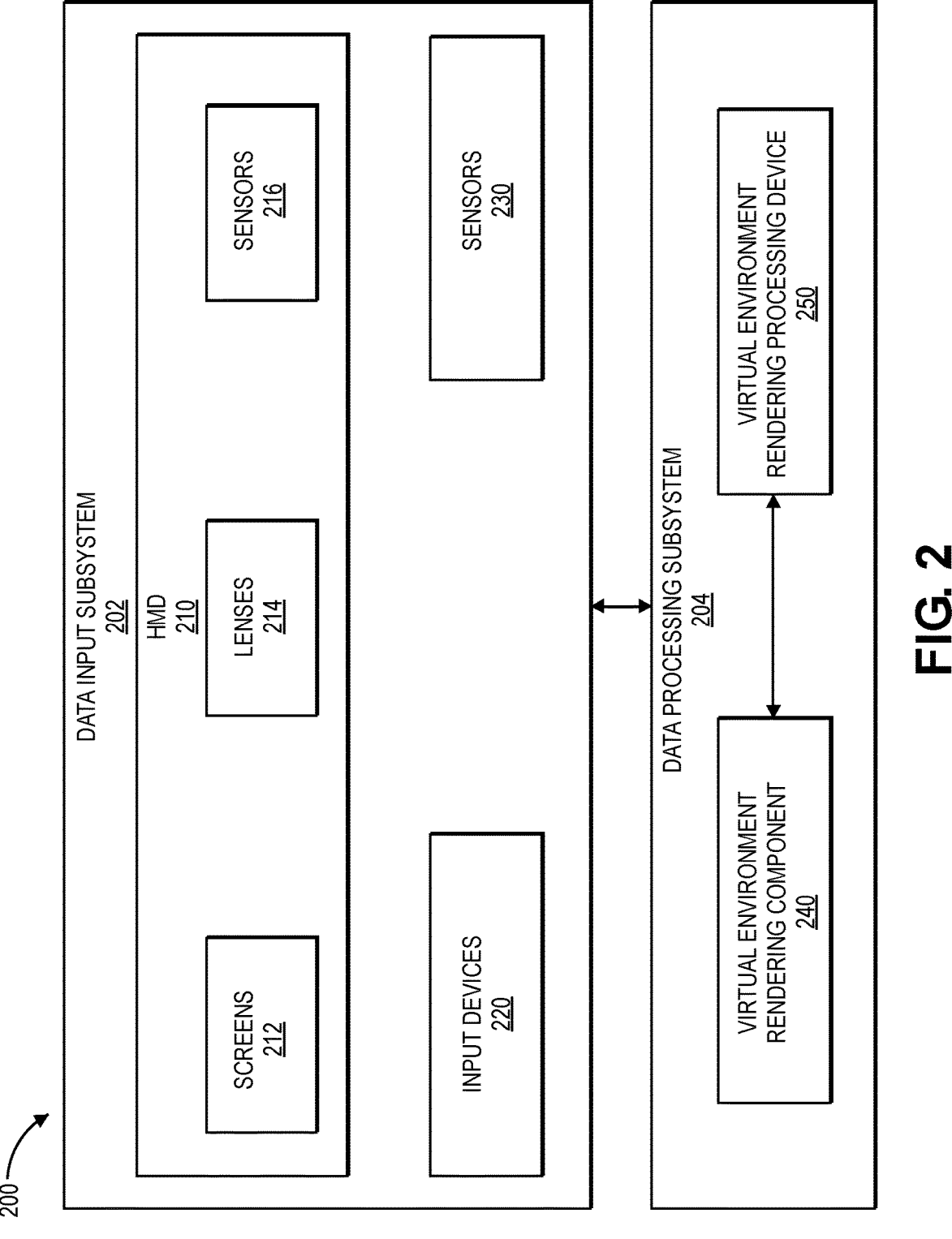

FIG. 2 is a diagram of an XR system ("system") 200 for generating virtual environments based on personalized recommendations, in accordance with some implementations. The system 200 can include data input subsystem 202 and data processing subsystem 204. The data input subsystem 202 can include a set of data collection components that can be used to obtain data from a user (e.g., user motion data, user input data), and the data processing subsystem 204 can include a set of data processing components that can be used to process the data obtained from the user to cause actions to be performed within a virtual environment.

For example, data input subsystem 202 can include head-mounted display (HMD) 210. Examples of head-mounted displays include headsets, glasses, etc. HMD can include set of screens 212 (e.g., high-resolution display screens), set of lenses 214, and set of sensors 216. A set of screens 210 can include multiple screens (e.g., a pair of screens) that can collectively generate a 3D visual effect for the user. A set of lenses 214 can include lenses to help focus images and adjust for user interpupillary distance (i.e., distance between the centers of the user's eyes). A set of sensors 216 can be used to track the position and/or movement of HMD 210 and/or the user's head. Examples of sensors of the set of sensors 216 can include accelerometers, gyroscopes, etc.

User subsystem 202 can further include a set of input devices 220 that can allow the user to interact with the virtual environment. For example, the set of input devices 220 can include at least one of: one or more hand controllers, one or more joysticks, etc. The data input subsystem 202 can further include the set of sensors 230. More specifically, the set of sensors 230 can include a set of motion tracking sensors to detect user movements and convert user movements into responses within the virtual environment. For example, set of sensors 230 can include one or more cameras to track the position and/or movement of the HMD and/or the set of input devices 220, one or more inertial sensors to detect user movement, etc. Set of sensors 230 can be placed within a room to optimize movement detection.

The data processing subsystem 204 can include virtual environment rendering component 240. The virtual environment rendering component 240 can be used to render a virtual environment that is realistic and immersive for the user, for XR applications (e.g., VR, AR and/or MR). The data processing subsystem 204 can utilize a high level of graphics processing power to render the virtual environment in real-time or near real-time. For example, data processing subsystem 204 can use a set of virtual environment rendering devices 250 to render the virtual environment in real-time or near real-time. The set of virtual environment rendering processing devices 250 can include hardware components, such as specialized graphics cards, high-performance processing units (e.g., central processing units (CPUs) and/or graphics processing units (GPUs), and/or other hardware components. Further details regarding XR system 200 are described above with reference to FIGS. 1A-1B and will be described in further detail below with reference to FIGS. 3-6.

Figure 3:
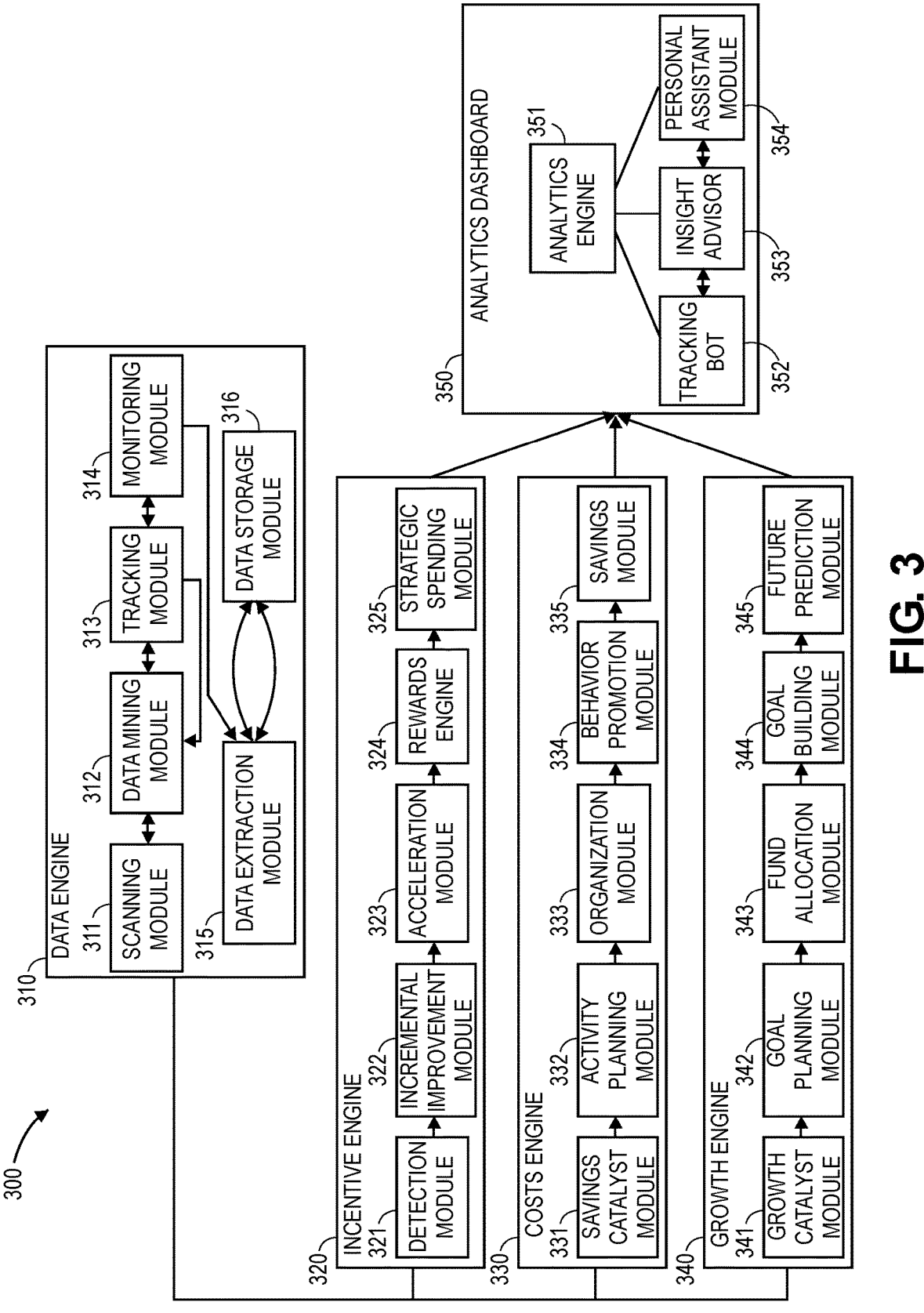
FIG. 3 is a diagram of an example computer system for identifying inefficiencies and generating personalized recommendations for remediating such by retrieving input data, generating recommendations based on classified behavior patterns, and displaying the recommendations to a user via a dashboard.

FIG. 3 is a block diagram of an example system 300 to implement methods for remediating inefficiencies in user behavior, in accordance with some implementations of the present disclosure. Depending on the implementation, the system 300 may include a data engine 310, an incentive engine 320, a costs engine 330, a growth engine 340, and/or an analytics dashboard 350. Depending on the implementation, various components of the system 300 may include one or more components of computing system 100 of FIG. 1A. For example, the analytics dashboard 350 may be, include, or be a component of the analytics system 140 of FIG. 1A. In further implementations, the system 300 may include additional, fewer, or alternative components as described with regard to FIG. 3, herein. As such, it will be understood that other configurations of the system 300 are possible.

In some implementations, the data engine 310 collects and analyzes data (e.g., spending data) from various sources (e.g., credit and debit cards, savings accounts, cryptocurrency, NFT, other financial instruments, etc.). Depending on the implementation, the data engine 310 may include a scanning module 311, a data mining module 312, a tracking module 313, a monitoring module 314, a data extraction module 315, and/or a data storage module 316.

In some implementations, the scanning module 311 may utilize ML and AI techniques to assist in scanning through different spending environments to detect and identify behavioral patterns (e.g., spending patterns of a user). In particular, the scanning module 311 uses a trained ML model to recognize different types of behavioral environments (e.g., spending environments, such as credit cards, debit cards, and other such financial instruments). The scanning module 311 detects such environments before analyzing and extracting data that is later saved for further analysis.

In further implementations, the data mining module 312 may utilize ML and AI techniques to extract insights from the user data collected by the scanning module 311. In particular, the data mining module 312 uses one or more trained machine learning algorithms to classify, rank, and/or segment the data to identify patterns and trends. The data mining module 312 can, for example, provide detailed information on spending habits, such as the most frequently used spending categories and how much money is spent on each category.

In further implementations, the tracking module 313 may similarly utilize ML and AI techniques to assist in tracking and analyzing user behavior (e.g., spending behavior at both an individual and group level). The tracking module 313 may use machine learning algorithms to identify patterns in the behavior of participants and categorize the behaviors detected as knowledge, which is later codified and fed to AI models of the monitoring module 314. The monitoring module 314 may identify and/or otherwise determine personalized and customer-driven patterns (e.g., spending patterns) by analyzing the features of the spending behavior.

In some implementations, the data extraction module 315 utilizes ML and AI techniques to extract and analyze spending data in the context of participant data (e.g., budget data). The data extraction module 315 may use supervised and unsupervised machine learning models to identify trends and patterns in user behavior (e.g., spending behavior). As such, the data extraction module 315 can help codify decisions and actions of the participants, providing a better understanding of how to improve user behavior (e.g., spending behavior).

In further implementations, the data engine 310 includes a data storage module 316, which enables secure storage of all raw, processed, and/or codified data. As such, the data storage module 316 provides a safe and secure storage facility for all the data collected by the data engine 310. The data can be further analyzed and visualized for decision-making purposes by other elements of the data engine 310 and/or the system 300.

In some implementations, data collected by the data engine 310 cycles through the modules multiple times before being stored at the data storage module 316. In further implementations, the data engine 310 automatically generates a data mesh every time a new transaction is detected to determine whether a correlation is detected (e.g., between an identified behavioral pattern or persona (as determined by the incentive engine 320, for example) and the new transaction behavior). In some such implementations, the data mesh functions as or on a decentralized platform associated with the user to determine any correlations between past and present behavior and/or a determined persona category.

In some implementations, the system 300 includes three additional units to analyze and remediate inefficiencies in user actions (e.g., spending): the incentive engine 320, the costs engine 330, and the growth engine 340. Depending on the implementation, each unit may be focused on a specific principle related to user actions and may utilize AI and/or ML capabilities to assist a user in achieving objectives and/or remediating user behavior.

In some implementations, the incentive engine 320 contains several components, including a detection module 321, an incremental improvement module 322, an acceleration module 323, a rewards engine 324, and/or a strategic spending module 325. Depending on the implementation, the incentive engine 320 may generally correlate spending behavior with saving for a user-defined goal to determine potential redirections and/or changes to spending habits to improve savings. For example, the incentive engine 320 may generate recommendations to spend more in some areas to overall save more.

In some implementations, the detection module 321 uses AI and/or ML techniques to scan participant behaviors and detect potential savings opportunities. The incremental improvement module 322 identifies beneficial incremental increases in user savings (e.g., retirement savings) by types and behaviors (e.g., spending types and behaviors), and adjusts recommendations and/or behaviors proactively as spending increases and diversifies. The acceleration module 323 uses forecasting and past behavior patterns to help accelerate savings as spending habits develop and leverages group patterns for enhanced forecasting. The rewards engine 324 compares past spending behaviors and generates recommendations to enable participants to make smart spending decisions, which are rewarded with increasing savings.

In further implementations, the strategic spending module 325 improves spending to increase savings. The strategic spending module 325 may help participants better grasp the benefits of adopting new spending habits that promote preparedness and readiness for a user goal, such as retirement. For example, the strategic spending module 325 may assist participants in determining and calculating a savings plans for a goal (e.g., retirement) based on the frequency and nature of user expenditures, including whether the expenditures are on luxury or non-luxury items. In particular, the strategic spending module 325 may notify users that the user should aim to save more when making infrequent luxury purchases, such as buying a ring or a car, while also planning for daily expenses like eating out. Conversely, when purchasing everyday essentials like groceries, less savings may be recommended by the strategic spending module 325, and no retirement savings may be recommended for infrequent medical expenses.

Depending on the implementation, the incentive engine 320 and/or modules of the incentive engine 320 determines recommendations and/or behavioral changes based on a determined persona for a user. In some such implementations, the incentive engine 320 (e.g., via the detection module 321) detects and classifies behavioral patterns based on stored data associated with one or more personas representative of user characteristics such as a job, geographical location, income level, marital status, age, and/or other such demographic information. For example, the incentive engine 320 may determine that a user should be categorized as a doctor, as an administrative worker, as a tradesperson, etc. The incentive engine 320 may then determine recommendations and/or behavioral recommendations based on the determined persona. For example, the incentive engine 320 may determine luxury expenses differently for a user in a doctor persona than in other personas. Similarly, the incentive engine 320 may account for user preferences and/or goals (e.g., a user who plans to save for an early retirement compared to a user who plans to continue working).

In some implementations, the costs engine 330 includes the savings catalyst module 331, an activity planning module 332, an organization module 333, a behavior promotion module 334, and a savings module 335. Depending on the implementation, the costs engine 330 may generally utilize knowledge of how participants are spending (e.g., via user-provided access to bank accounts, contributions, manual entering of information, etc.) to determine costs that disorganized behavior causes for the user. As such, the costs engine 330 determines potential organization to the user behavior to remediate inefficiencies in saving or working towards a goal such as retirement.

Depending on the implementation, the savings catalyst module 331 promotes and enables organized behavior through education and awareness. In some implementations, the savings catalyst module 331 receives data from the data engine 310 and/or other engines of the system 300. The savings catalyst module 331 may be utilized by the costs engine 330 in conjunction with other modules of the costs engine 330 to identify opportunities for savings and/or costs in user data and/or user behavioral patterns.

The activity planning module 332 plans activities for a user and/or guides users in proactively planning and scheduling events with the help of gamification. For example, the activity planning module 332 may offer rewards (e.g., virtual currency, virtual items, real-world discounts, etc.) to a user for creating and/or following a schedule. In some such implementations, the activity planning module 332 determines and generates a schedule for the user in conjunction with other modules as described herein.

In further implementations, the organization module 333 enables participants to better organize savings based on user priorities. For example, the organization module 333 may receive indications of one or more user priorities from the data engine, from the user via a user interface, from one or more sensors directly, etc. The organization module 333 may then provide one or more recommendations for savings organization based on planned activities via the analytics dashboard 350. Depending on the implementation, the organization module 333 may organize activities and/or provide recommendations for such according to the personas and/or classifications for the user behavior as determined by the incentive engine 320. In some implementations, the organization module 333 interfaces with a remainder of the costs engine 330 to pull data from the data engine 310 based on the persona and/or classification for the user as determined by the incentive engine 320.

In further implementations, the behavior promotion module 334 accelerates the promotion of frugal behaviors that can lead to higher and accelerated savings, but with higher risks and budget impact (e.g., investment opportunities). For example, the behavior promotion module 334 (e.g., in conjunction with other modules such as the organization module 333 and/or activity planning module 332) may identify and/or generate one or more recommendations for activities in line with behavior that is reflective of such accelerated savings.

In some implementations, the savings module 335 identifies historical participant behaviors (e.g., spending and savings behaviors). Using such historical behaviors, the savings module 335 determines and/or generates recommendations for actions representative of improved wise saving habits. Depending on the implementation, the savings module 335 provides such recommendations through gamification, education, and awareness. In particular, the savings module 335 provides recommendations for practices that, when implemented by a user, enable the user to more effectively and efficiently build a savings fund.

In some implementations, the savings module 335 works in conjunction with other modules of the costs engine 330 and/or the rest of the system 300 to generate recommendations that are consistent with user preferences or behaviors. Further, the savings module 335 may generate recommendations that may be counterintuitive to a user (e.g., spending money to save money) but match with a generated user persona and/or other behavior category. For instance, generating a recommendation for a user to schedule an annual medical check-up can help prevent health issues and save money in the long run despite costing money in the short term.

In still further implementations, the savings module 335 gamifies savings activities and/or generates recommendations to address potential inefficiencies in user behavior based on the persona(s) in which the user behavior falls. Depending on the implementation, the savings module 335 may compare the user activity to those in a similar persona based on careers (e.g., colleagues), preferences and/or activities (e.g., friends), family members, etc.

In some implementations, the growth engine 340 includes a growth catalyst module 341, a goal planning module 342, a fund allocation module 343, a goal building module 344, and a future prediction module 345. In further implementations, the growth engine 340 and modules of the growth engine 340 is focused on delivering towards the principle that early small allocations can lead to compound growth and a more likely achievement of user goals (e.g., retirement savings) in the future. In particular, by detecting early patterns and opportunities for growth, the growth engine 340 can cause early remediation of inefficiencies that may compound over time and/or avoid missed opportunities for growth that would compound over time into larger savings opportunities.

In some implementations, the growth catalyst module 341 functions similarly to the savings catalyst module 331. In particular, the growth catalyst module 341 may receive data from the data engine 310 and/or other engines of the system 300. Further, the growth engine 340 may utilize the growth catalyst module 341 in conjunction with other modules of the growth engine 340 to determine opportunities for compound growth in user actions and/or behavioral patterns.

In further implementations, the goal planning module 342 assists users in planning to securely achieve a goal (e.g., retirement) through early education, awareness, and intuitive intelligent guidance. In particular, the goal planning module 342 may use determined opportunities for compound growth in conjunction with data regarding the user and/or user behavior patterns to plan steps and recommendations for achieving a user goal (e.g., retirement).

The fund allocation module 343 determines, classifies, ranks, and/or recommends small fund allocations in a strategic way that can lead to compound growth and secure achievement of a user goal. For example, the fund allocation module 343 may determine that small fund allocations away from consistent luxury goods or services to a savings or investment account will lead to greater growth for the user. The goal building module 344 helps determine opportunities to build wealth over time by leveraging past budget, spending, activity, and campaign data (e.g., received from the data engine 310).

The future prediction module 345 promotes behaviors focused on the future of the participants by generating recommendations and potential predicted outcomes for a user. In particular, the future prediction module 345 may generate predictions highlighting potential outcomes of user actions, both according to provided recommendations and by ignoring recommendations. Depending on the implementation, the future prediction module 345 may provide predictions through learning, education, and gamification tools (e.g., as described above). In some implementations, the future prediction module 345 establishes user goal objectives (e.g., retirement objectives) and creates a variety of scenarios to achieve such objectives (e.g., in conjunction with other modules in the growth engine 340). The future prediction module 345 then provides predictions with regard to potential outcomes in following such scenarios as well as providing feedback to a user by consistently emphasizing the benefits of present savings efforts in terms of future value, taking into account the effects of compound interest and growth.

In some implementations, the future prediction module 345 and/or other modules of the growth engine 340 may compare the predictions for the user to predictions for others in a persona category (e.g., as described with regard to incentive engine 320 and/or costs engine 330 above). In further implementations, the future prediction module 345 may determine an expected date, age, etc. of retirement for the user and compare such to behaviors of friends, colleagues, and/or family members with similar titles, salaries, etc. For example, the future prediction module 345 may determine that a colleague with a similar salary will retire earlier because of earlier investments and/or taking advantage of opportunities that the user may miss otherwise. As such, the future predictions module 345 provides continuous clustering of different personas to identify opportunities for improvement of goals and remediate inefficiencies in achieving such goals.

The analytics dashboard 350 may be an AI/ML driven interface that enables users to display a dashboard on any compatible device, including smartphones, tablets, laptops, XR devices (e.g., as described above with regard to FIG. 2), etc. In some implementations, the analytics dashboard 350 generates and/or provides analytics that can be visualized in various formats such as numbers, charts, avatars, and stories. Depending on the implementation, a user can customize the dashboard based on user preferences or let the system automatically design a personalized dashboard for the user based on determined behaviors, features of interest, case of use, and other such factors.

The analytics dashboard 350 may comprise several components, including an analytics engine 351, a tracking bot 352, an insight advisor 353, and/or a personal assistant module 354. In some implementations, the analytics engine 351 is an intelligent analytics engine that can highlight various spending and savings scenarios and/or provide users with visualizations that encourage frugal behavior and goal planning. In particular, the analytics engine 351 may use a machine learning model to take outputs from the various engines of system 300 (e.g., incentive engine 320, costs engine 330, growth engine 340, etc.) to generate final scenario recommendations based on user history and/or behavioral patterns (e.g., from data gathered by data engine 310). In further implementations, the analytics engine 351 may compare other users within a similar persona, as described above.

Further, the tracking bot 352 may function as a digital assistant that tracks and monitors spending data efficiently and conveniently. For example, the tracking bot 352 may determine that a user is following a plan as generated by the savings module 335, strategic spending module 325, goal building module 344, etc. Similarly, the tracking bot 352 may determine that a user is spending consistently with a future prediction scenario generated by the future prediction module 345. The tracking bot 352 can help users stay on top of spending and highlight the importance of saving by showing how spending less or more intelligently can lead to more savings in the future.

In some implementations, the insight advisor 353 similarly generates and provides graphical advice and guidance for better spending habits to a user. In particular, the insight advisor 353 functions in conjunction with the tracking bot 352 and analytics engine 351 to generate graphical representations of recommendations for remediating user inefficiencies. By providing graphical representations of recommendations and/or scenarios as determined by the analytics engine 351 and/or other elements of the system 300, the insight advisor 353 helps users make informed decisions about spending and shows them how to be more organized to achieve better savings and more securely achieve goals.

In some implementations, the personal assistant module 354 is an AI/ML tool that functions as an assistant to users in managing behaviors and habits (e.g., spending habits). In further implementations, the personal assistant module 354 shows users how early, small allocations can lead to compound growth and a more secure goal in the future (e.g., by determining which graphical representations to provide to a user, determining when to provide information to a user, etc.). In some implementations, the personal assistant module 354 may function responsive to an input from a user (e.g., via a user interface, via a voice command, via a user decision, etc.), automatically (e.g., upon determining behavior from a user deviates, upon determining that saving or spending reaches a predetermined threshold, upon a predetermined schedule, etc.), and/or in some combination of such. Depending on the implementation, the personal assistant module 354 may function as an interface for the user and the analytics dashboard 350, prompting the user for permission to perform tasks, access information, provide recommendations, etc.

In some implementations, the personal assistant module 354 may use and or interface with a module (e.g., the analytics module 351) using models (e.g., an LLM) to identify and generate recommended next actions, schedules, etc.; providing the user with alerts, education, and information to allow the user to accept specific changes to behavioral patterns; and/or making updates to a user schedule, spending plan, etc. The personal assistant module 354 and/or other modules of the analytics dashboard 350 uses additional machine learning solutions training (e.g., LLM solutions training) on a corpus of data (e.g., from the data storage module 316) and uses models such as Generative Adversarial Networks (GAN) models to generate recommendations. In some implementations, the analytics dashboard 350 and/or modules of the analytics dashboard 350 may further detect and stop propagation of misalignments, errors, hallucinations, and/or other such mistakes that could cause errors in the machine learning models. Similarly, the personal assistant module 354 and/or other modules of the analytics dashboard 350 may use text-to-speech functionality, graphical image generation models, etc. to provide representations of what a user retirement will look like after a predetermined and/or user-selected period of time (e.g., 10 years, 20 years, 30 years, etc.) following recommendations to remediate inefficiencies as determined by other engines in the system 300.

In still further implementations, the analytics dashboard 350 may additionally gamify the recommendations by providing rewards for following the recommendations and/or comparing/contrasting the recommendations and/or outcomes to other individuals within a categorized persona, as described above with regard to the incentive engine 320, the costs engine 330, and/or the growth engine 340.

FIG. 4 is a flow diagram of an example method 400 to implement personalized recommendation systems to remediate inefficiencies in user behavior, in accordance with some implementations of the present disclosure. Method 400 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 400 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 410, the system receives input data reflective of a user from at least one data source. In some implementations, the system may receive the input data from at least one data source. Depending on the implementation, the at least one data source may include an internal data source and/or an external data source, as described herein. In further implementations, the at least one data source may include an XR data source or a non-XR data source.

At block 420, the system generates, using a first machine learning model, a user behavior pattern for the user based on the input data representative of the user. Depending on the implementation, the first machine learning model may be trained according to unsupervised techniques, supervised techniques, semi-supervised techniques, reinforcement techniques, and/or any other such machine learning technique as described herein. The first machine learning model may generate the user behavior pattern by detecting user behavior according to a pattern recognition model.

At block 430, the system classifies, using a machine learning model, the input data based on one or more personas representative of user characteristics to generate classified input data. The one or more personas may include at least one user persona representative of the user. Depending on the implementation, the one or more personas may be based on a career, a salary, a geographical location, etc.

At block 440, the system identifies, based on at least the input data and the one or more personas, an inefficiency in the user behavior pattern impacting a goal of the user. In some implementations, identifying the inefficiency includes predicting, using an additional machine learning model, a potential outcome for one or more actions consistent with the user behavior pattern and identifying the inefficiency based on the potential outcome including a negative effect on a goal of the user. In further implementations, the system predicts the potential outcome based at least on one or more historical outcomes associated with a persona of the one or more personas associated with the user behavior pattern. For example, the system may predict the potential outcome using a machine learning model trained on data from users associated with the persona category (e.g., other doctors for the doctor persona, etc.).

In further implementations, the system predicts, using the additional machine learning model, a second potential outcome for a second user with a second user behavior pattern belonging to a same persona as the user behavior pattern. In some such implementations, generating the recommendation (as described below with regard to block 450) is further based at least on the second potential outcome.

At block 450, the system generates, using a second machine learning model, a personalized recommendation for the user to remediate the identified inefficiency. Depending on the implementation, the second machine learning model may be an LLM, a GAN model, and/or a model as otherwise described herein.

In some implementations, the system further generates a personalized user recommendation display for the user and displays the personalized user recommendation display to the user. Depending on the implementation, the personalized user recommendation display may be based on one or more user preferences (e.g., a preference for visual displays such as graphs, a preference for textual recommendations, a preference for video-focused recommendations, etc.). In further implementations, the system receives a confirmation regarding the personalized recommendation. The system then determines that the user has performed one or more actions associated with carrying out the personalized recommendation and, in response, causes a reward to be distributed to the user.

FIG. 5 is a flow diagram of an example method 500 to manage training and deployment of ML models implemented by trigger-driven personalized recommendations systems, in accordance with some implementations of the present disclosure. Method 500 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 500 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 510, processing logic obtains input data for ML model training. Obtaining the input data can include ingesting data collected from a set of data sources, and storing the ingested data as the input data. For example, the data collected from the set of data sources can include non-XR data obtained from a set of non-XR data sources (e.g., websites, applications, IoT devices and/or client devices). As another example, the data collected from the set of data sources can include XR data obtain from a set of XR data sources (e.g., VR systems, AR systems and/or MR systems). As yet another example, the data collected from the set of data sources can include synthetic data to simulate actual non-XR data and/or XR data. In some implementations, the data collected from set of data sources includes raw data, and obtaining the input data can further include preprocessing the raw data. For example, obtaining the input data can include performing, with respect to the raw data, at least one of: data cleaning, categorical variable encoding, dimensionality reduction, feature scaling, NLP, etc.

In some implementations, dimensionality reduction is performed to reduce dimensionality of features extracted from the raw data while preserving relevant information contained within the raw data. Dimensionality reduction can enable various improvements to the ability of a processing device to train the at least one ML model. For example, by reducing the number of features, dimensionality reduction can improve the computational efficiency and reduce storage resource consumption for training at least one ML model. As another example, dimensionality reduction can increase ML model prediction accuracy by filtering out irrelevant features within the raw data (e.g., noise). As yet another example, by reducing the dimensionality of the data, dimensionality reduction can mitigate effects of overfitting that may be observed by training the at least one ML model with higher-dimensional data. Overfitting refers to a phenomenon in which a ML model performs well on the input data used to train the at least one ML model, but not as well on new, unseen data. In some implementations, performing dimensionality reduction includes performing feature selection. Performing feature selection includes selecting, from a set of features, a subset of relevant features and discarding the remaining features of the set of features. In some implementations, performing dimensionality reduction incudes performing feature extraction. Feature extraction includes transforming an initial set of features into a set of relevant features. For example, each feature of the set of relevant features obtained using feature extraction can be a linear combination of features of the initial set of features. In some implementations, performing dimensionality reduction includes performing matrix factorization. Examples of techniques that can be used to perform dimensionality reduction include Principal Component Analysis (PCA), Kernel PCA, Sparse PCA, Incremental PCA, Linear Discriminant Analysis (LDA), Independent Component Analysis (ICA), t-Distributed Stochastic Neighbor Embedding (t-SNE), autoencoding, Isometric Mapping (Isomap), Locally Linear Embedding (LLE), random linear projections, Truncated Singular Value Decomposition (SVD), matrix factorization, etc.

In some implementations, feature scaling is performed to normalize the scale of features of the set of features. A scale of a feature refers to the range of values that the feature can take within data. For example, an age feature can range from 0 to 100, while an income feature can range from 0 to 1,000,000. Feature scaling is performed since some ML models can be sensitive to feature scale. Feature scaling can improve computational efficiency by improving convergence speed and/or ML model performance. Examples of feature scaling techniques include min-max scaling to scale features to a range (e.g., between 0 and 1), Z-score scaling to transform features to have a mean of 0 and a standard deviation of 1, etc.

At block 520, processing logic selects at least one ML model to make predictions for generating personalized recommendations. Selection of a ML model can depend on various factors, such as the ML task (e.g., generalized personalized recommendations), computational resource availability, desired prediction accuracy, etc. In some implementations, the at least one ML model includes a predictive model. In some implementations, the at least one ML model includes at least one neural network (NN). For example, the at least one NN can include at least one of: a feedforward neural network (FNN), a recurrent neural network (RNN), a deep neural network (DNN), a convolutional neural network (CNN), etc. In some implementations, the at least one ML model includes a deep learning model.

In some implementations, the at least one ML model includes a collaborative filtering model to generate a personalized recommendation for a user. For example, a collaborative filtering model can be a user-based collaborative filtering model in which a personalized recommendation can be made for a user based on a cohort of similar users (e.g., users having similar data profiles, preferences, behaviors). As another example, a collaborative filtering model can be an item-based collaborative filtering model in which a personalized recommendation can be made for a user based on a similarity of items that the user had previously interacted with (e.g., shown interest in).

In some implementations, the at least one ML model includes a content-based filtering model to generate a personalized recommendation for a user. Generally, a content-based filter model generates a personalized recommendation for a user based on both attributes of items and preferences of the user. That is, a personalized recommendation generated by a content-based filtering model can generate a personalized recommendation for a user based on things that the user has already shown interest in.

In some implementations, the at least one ML model includes a hybrid model. For example, a hybrid model can combine collaborative filtering with another technique, such as content-based filtering.

In some implementations, a ML model is a supervised learning model that can be trained using a supervised learning method. A supervised learning method utilizes labeled training datasets to train a machine learning model to make predictions. More specifically, a supervised learning method can be provided with input data (e.g., features) and corresponding output data (e.g., target data), and the ML model learns to map the input data to the output data based on the examples in the labeled dataset. For example, to train the ML to perform a classification, the input data can include various attributes of an object or trigger, and the output data may be a label or category. The labeled dataset would contain examples of these objects or triggers along with their corresponding labels. The ML model would be trained to map the input data to the correct label by analyzing the examples in the labeled dataset. Examples of supervised learning methods include linear regression learning, logistic regression learning, decision tree learning, SVM learning, learning, gradient boosting learning, etc.

In some implementations, a ML model is an unsupervised learning model that can be trained using an unsupervised learning method. An unsupervised learning method trains a machine learning model to make predictions without using labeled training datasets. More specifically, a supervised learning method can be provided with input data (e.g., features) without corresponding output data (e.g., target data), and the ML model learns to map the input data to output data by identifying relationships (e.g., patterns) within the input data. For example, identifying relationships within the input data can include identifying groups of similar datapoints (e.g., clusters), or underlying structures within the input data. Examples of unsupervised learning methods include clustering (e.g., k-means clustering, principal component analysis (PAC), autoencoding, etc.

In some implementations, a ML model is a semi-supervised learning model that can be trained using semi-supervised learning. In contrast to supervised learning where the input data includes only labeled training datasets, and unsupervised learning where the input data does not include any labeled training datasets, semi-supervised learning involves training an ML model to make predictions using datasets that include a combination of labeled data and unlabeled data. Semi-supervised learning can be used to improve the accuracy of the ML model, such as in cases where obtaining a labeled data is expensive and/or time-consuming. For example, a labeled training dataset can be used to learn the structure of a machine learning modeling problem, and the unlabeled training dataset can be used to identify general features of the data. Examples of semi-supervised learning methods include self-training, co-training, and multi-view learning.

Self-training refers to a method in which labeled data of a dataset is used to train an initial ML model, and the initial ML model is then used to make label predictions for unlabeled data of the dataset. The most confidently predicted outputs can be added to the labeled data to obtain an expanded dataset, the ML model can then be retrained on the expanded dataset. The training process can stop when there is no additional improvement to ML model performance.

Co-training refers to a method in which each ML model of a group of ML models (e.g., a pair of ML models) is trained on a respective subset of labeled data of a dataset to predict labels of unlabeled data of the dataset. For example, each ML model can be a classifier model. The most confidently predicted outputs can be added to the labeled data to obtain an expanded dataset, and each ML model can be retrained using the expanded dataset. The training process can stop when each ML of the group of ML models converges and/or when there is no additional improvement to ML model performance.

Multi-view learning refers to a method in which multiple ML models are each trained on a respective view of data. Each view of data can be obtained in a particular way, such as using different feature representations, different sensors, or different modalities. The individual predictions made by the ML models can then be combined to make a final prediction.

In some implementations, the ML model is a reinforcement learning model that can be trained using reinforcement learning. Examples of reinforcement learning models include value-based models, policy-based models, model-based models, deep reinforcement learning models, multi-agent reinforcement learning models, etc.

At block 530, processing logic trains the at least one ML model using at least a portion of the input data to obtain a trained ML model. Generally, training a ML model involves adjusting the parameters of the ML model to minimize the difference between a prediction made by the ML model using the input data and corresponding ground truth. For example, a prediction made by a ML model using the input data can be a personalized recommendation predicted for a user, and the corresponding ground truth can be an actual personalized recommendation determined for the user. Examples of training techniques include gradient descent, backpropagation, etc. The at least one ML model can be trained using at least one of: supervised learning, unsupervised learning, semi-supervised learning, reinforcement learning, etc. In some implementations, training a ML model includes dividing the input data into multiple subsets, and training the ML model on each subset separately (e.g., cross-validation training).

In some implementations, training the at least one ML model includes using regularization technique to trigger overfitting and/or training instability during training. A regularization technique can increase ML model generalization and increase the speed of training convergence. For example, regularization technique can be applied to a deep learning model. Examples of regularization techniques include L1 regularization, L2 regularization, Elastic Net, dropout, batch normalization, etc. The choice of regularization technique can depend on the type of ML model, attributes of the data, etc.

At block 540, processing logic evaluates a trained ML model. For example, evaluating the trained ML model can include using the trained ML to make a set of predictions using a validation dataset and analyzing the set of predictions to obtain at least one performance metric. In some implementations, the at least one performance metric includes accuracy (e.g., a measure of the proportion of correct predictions of the set of predictions generated by the trained ML model). In some implementations, the at least one performance metric includes at least one of a precision metric or a recall metric (e.g., an F-score). In some implementations, evaluating the trained ML model includes generating a confusion matrix. A confusion matrix refers to a tabular data structure that compares, for a testing dataset, predicted outputs generated by an ML model ("predicted class") to actual outputs generated by the ML model ("actual class"). Entries within the confusion matrix can be used to determine true positives, false positives, true negatives and/or false negatives, which can be used to determine the at least one performance metric (e.g., accuracy, precision, recall and/or F-score).

At block 550, processing logic determines whether the trained ML model is ready for deployment. For example, determining whether the trained ML model is ready for deployment can include determining whether the at least one performance metric satisfies a threshold performance condition. For example, determining whether the at least one performance metric satisfies a threshold performance condition can include at least one of: determining whether an accuracy of a trained ML model is greater than or equal to a threshold accuracy, determining whether a precision of the trained ML model is greater than or equal to a threshold precision, determining whether a recall of the trained ML model is greater than or equal to a threshold recall, determining whether an F-score of the trained ML model is greater than or equal to a threshold F-score, etc.

If the trained ML model is determined be ready for deployment (e.g., the at least one performance metric satisfies the threshold performance condition), then processing logic at block 560 can deploy the trained ML model. For example, deploying the trained ML model can include storing the trained ML model, which can be accessible by an analytics system of a recommendation system to generate personalized recommendations. The trained ML model can be periodically updated over time (e.g., tuned) based on feedback data (e.g., non-XR data and/or XR data).

If the trained ML model is determined not to be ready for deployment (e.g., the at least one performance metric does not satisfy the threshold performance condition), then processing logic can tune the trained ML model to obtain a tuned ML model at block 570. In some implementations, tuning the trained ML model can include retraining the ML model using additional training data, similar to block 530. In some implementations, tuning the trained ML model can include tuning at least one hyperparameter of the trained ML model. The tuned ML model can then be evaluated at block 540 to determine whether it is ready for deployment at block 550.

Depending on the implementation, blocks 540-570 can be repeated for any number of ML models that are being trained to generate personalized recommendations for users. Further details regarding blocks 510-570 are described above with reference to FIGS. 1A-4.

Figure 6:
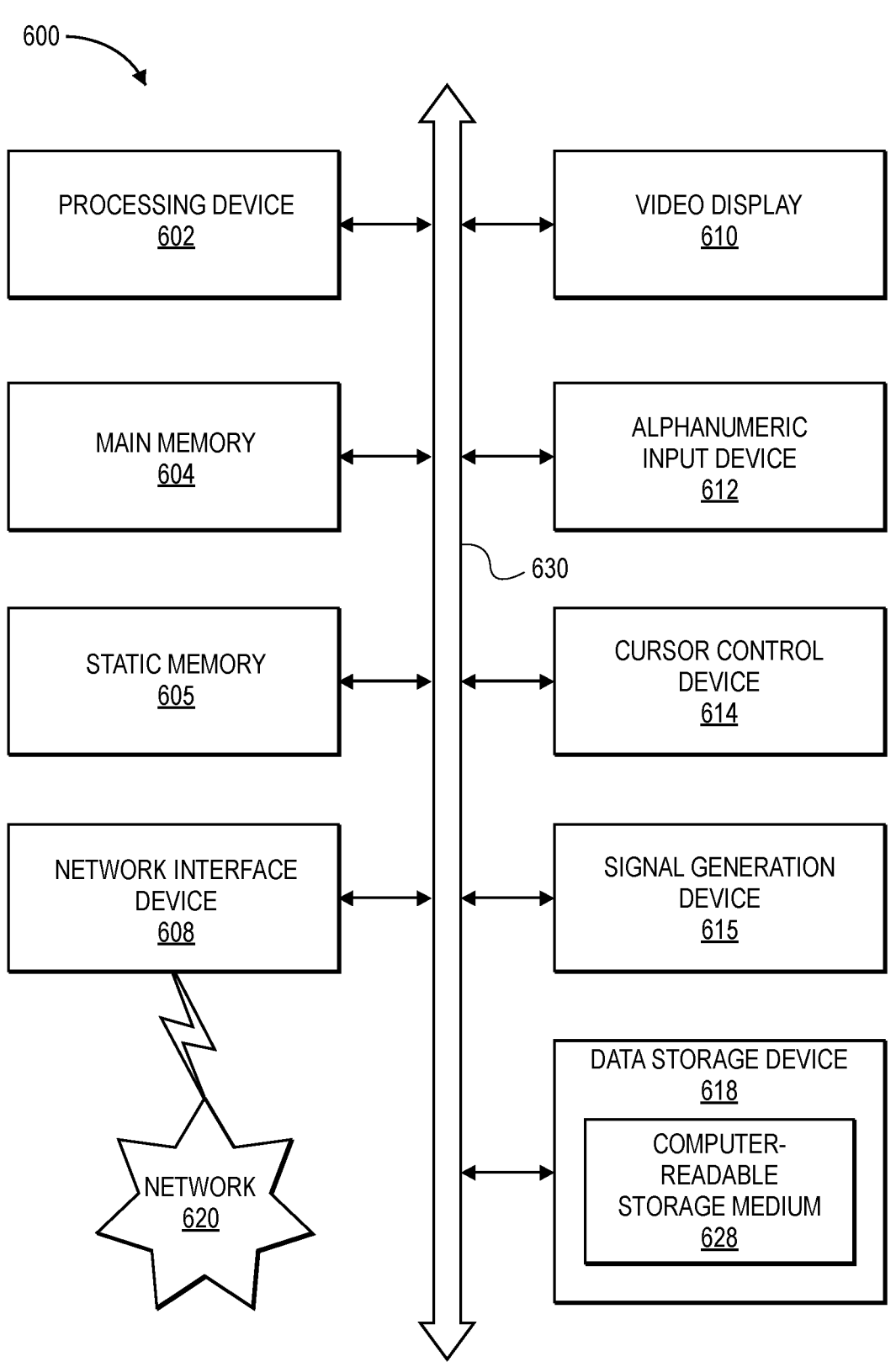
FIG. 6 is a block diagram of an example computer system in which implementations of the present disclosure may operate.

FIG. 6 illustrates a diagrammatic representation of a computer system 600, which may be employed for implementing the methods described herein. The computer system 600 may be connected to other computing devices in a LAN, an intranet, an extranet, and/or the Internet. The computer system 600 may operate in the capacity of a server machine in a client-server network environment. The computer system 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 600 may represent one or more servers of a computing system implementing methods 300-500.

The example computer system 600 may include a processing device 602, a main memory 604 (e.g., synchronous dynamic random access memory (DRAM), read-only memory (ROM)), and a static memory 605 (e.g., flash memory and a data storage device 618), which may communicate with each other via a bus 530.

The processing device 602 may be provided by one or more general-purpose processing devices such as a microprocessor, central processing unit, or the like. In an illustrative example, the processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also comprise one or more special-purpose processing devices such as an application specific integrated circuit (ASIC), a field programmable gate array (FPGA), a digital signal processor (DSP), a network processor, or the like. The processing device 602 may be configured to execute methods of managing computing systems, in accordance with one or more aspects of the present disclosure.

The computer system 600 may further include a network interface device 608, which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and/or an acoustic signal generation device 615 (e.g., a speaker). In some embodiments, video display unit 610, alphanumeric input device 612, and cursor control device 614 may be combined into a single component or device (e.g., an LCD touch screen).

The data storage device 618 may include a computer-readable storage medium 628 on which may be stored one or more sets of instructions (e.g., instructions of the methods of automated review of communications, in accordance with one or more aspects of the present disclosure) implementing any one or more of the methods or functions described herein. The instructions may also reside, completely or at least partially, within main memory 604 and/or within processing device 602 during execution thereof by computer system 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for generating personalized recommendations predicted to remediate detected inefficient user behaviors, the method comprising:

receiving, by one or more processors and from at least one data source, input data representative of a user, wherein the at least one data source includes an extended reality (XR) data source and the input data includes XR input data and non-XR input data;

transforming, by the one or more processors, at least part of the input data representative of the user into transformed input data, the at least part of the input data including the XR input data and the transformed input data formatted for machine learning analysis;

generating, by the one or more processors and using a first machine learning model, a user behavior pattern for the user based on the transformed input data representative of the user;

classifying, by the one or more processors, the user behavior pattern based on one or more personas representative of user characteristics;

identifying, by the one or more processors and based on at least the transformed input data and the one or more personas, an inefficiency in the user behavior pattern impacting a goal of the user, wherein the identifying the inefficiency includes:

predicting, using a third machine learning model, a potential outcome for one or more actions consistent with the user behavior pattern, and identifying the inefficiency based on the potential outcome including a negative effect on the goal of the user;

generating, by the one or more processors using a second machine learning model including a collaborative filtering model, a personalized recommendation for the user to remediate the inefficiency;

generating, by the one or more processors, a personalized user recommendation display for the user; and automatically displaying, by the one or more processors, the personalized recommendation to the user via a preferred location of the personalized user recommendation display based on one or more user format preferences of the user.

2. The method of claim 1, wherein the predicting the potential outcome is based at least on one or more historical outcomes associated with a persona of the one or more personas associated with the user behavior pattern.

3. The method of claim 1, further comprising:

predicting, by the one or more processors using the third machine learning model, a second potential outcome for a second user with a second user behavior pattern belonging to a same persona as the user behavior pattern;

wherein generating the personalized recommendation is further based at least on the second potential outcome.

4. The method of claim 1, wherein the user characteristics include at least one of a user career or a user salary.

5. The method of claim 1, wherein the second machine learning model includes a generative artificial intelligence using a large language machine learning model.

6. The method of claim 1, further comprising:

receiving, by the one or more processors, a confirmation regarding the personalized recommendation;

determining, by the one or more processors, that the user has performed one or more actions associated with carrying out the personalized recommendation; and in response, causing, by the one or more processors, a reward to be distributed to the user.

7. A computing device configured to generate predictive and event-based action recommendations, the computing device comprising:

one or more processors; and a non-transitory computer-readable medium coupled to the one or more processors and storing instructions thereon that, when executed by the one or more processors, cause the computing device to:

receive, from at least one data source, input data representative of a user, wherein the at least one data source includes an extended reality (XR) data source and the input data includes XR input data and non-XR input data;

transform at least part of the input data representative of the user into transformed input data, the at least part of the input data including the XR input data and the transformed input data formatted for machine learning analysis;

generate, using a first machine learning model, a user behavior pattern for the user based on the transformed input data representative of the user;

classify the user behavior pattern based on one or more personas representative of user characteristics;

identify, based on at least the transformed input data and the one or more personas, an inefficiency in the user behavior pattern impacting a goal of the user, wherein identifying the inefficiency includes:

predicting, using a third machine learning model, a potential outcome for one or more actions consistent with the user behavior pattern, and identifying the inefficiency based on the potential outcome including a negative effect on the goal of the user;

generate, using a second machine learning model including a collaborative filtering model, a personalized recommendation for the user to remediate the inefficiency;

generate a personalized user recommendation display for the user; and automatically display the personalized recommendation to the user via a preferred location of the personalized user recommendation display based on one or more user format preferences of the user.

8. The computing device of claim 7, wherein predicting the potential outcome is based at least on one or more historical outcomes associated with a persona of the one or more personas associated with the user behavior pattern.

9. The computing device of claim 7, wherein the non-transitory computer-readable medium further stores instructions that, when executed by the one or more processors, cause the computing device to:

predict, using the third machine learning model, a second potential outcome for a second user with a second user behavior pattern belonging to a same persona as the user behavior pattern;

wherein generating the personalized recommendation is further based at least on the second potential outcome.

10. The computing device of claim 7, wherein the user characteristics include at least one of a user career or a user salary.

11. The computing device of claim 7, wherein the second machine learning model includes a generative artificial intelligence using a large language machine learning model.

12. The computing device of claim 7, wherein the non-transitory computer-readable medium further stores instructions that, when executed by the one or more processors, cause the computing device to:

receive a confirmation regarding the personalized recommendation;

determine that the user has performed one or more actions associated with carrying out the personalized recommendation; and in response, cause a reward to be distributed to the user.

\* \* \* \* \*